Aug. 11, 1959   R. S. BLEY ET AL   2,898,627
PROCESS AND APPARATUS FOR THE CONTINUOUS
PRODUCTION OF SYNTHETIC THREAD
Filed Oct. 30, 1953   15 Sheets-Sheet 1

INVENTORS
RUDOLPH S. BLEY
RALPH H. CARTER
DONALD J. EDGAR
LA VERNE R. GRAYBEAL
KNUTE M. SCHMIDT

BY Rudolph S. Bley
ATTORNEY

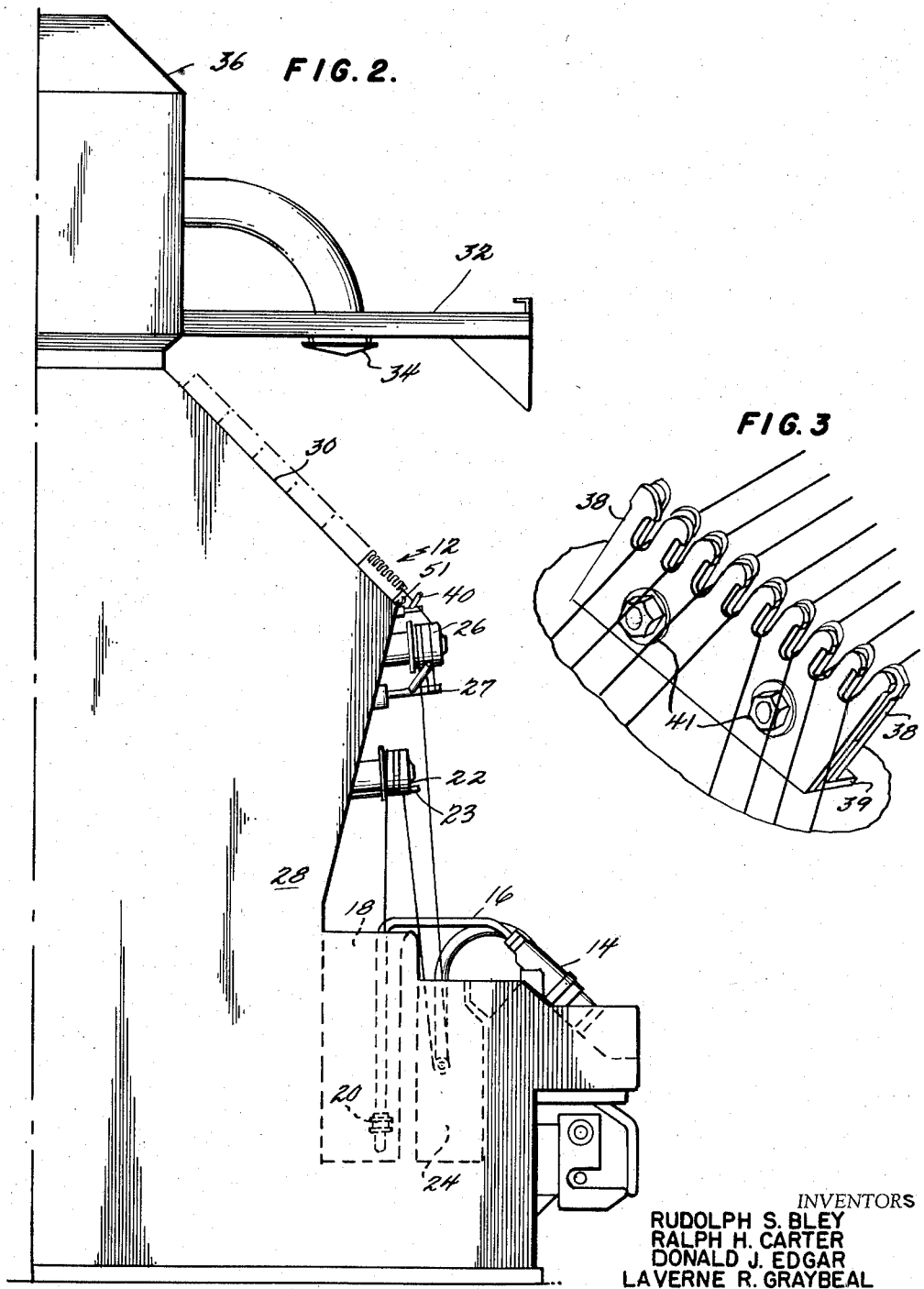

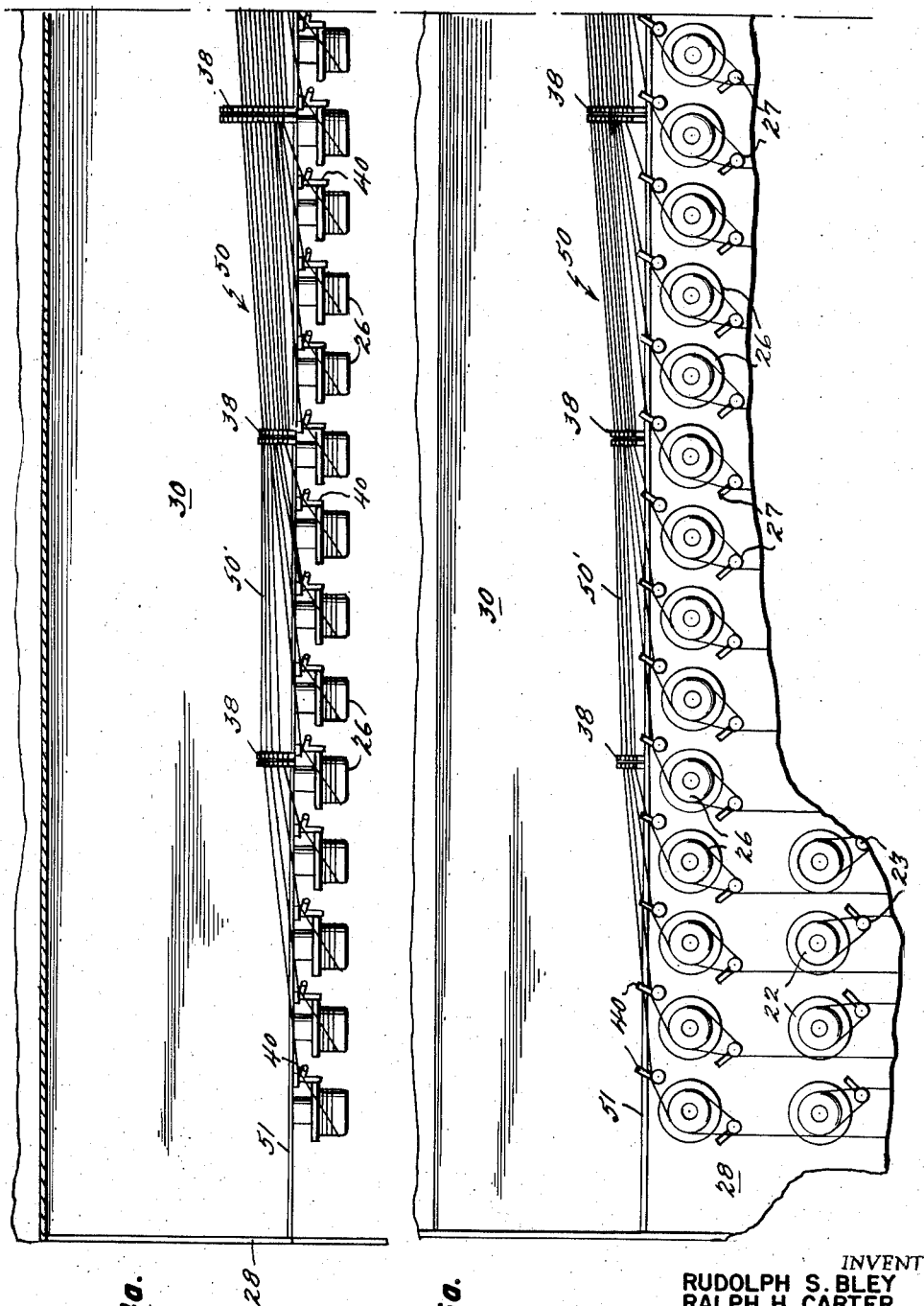

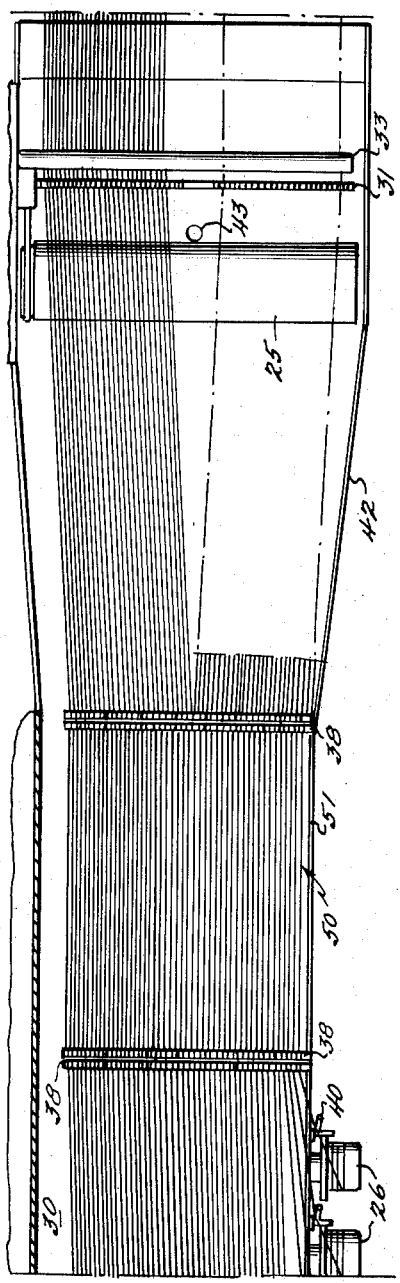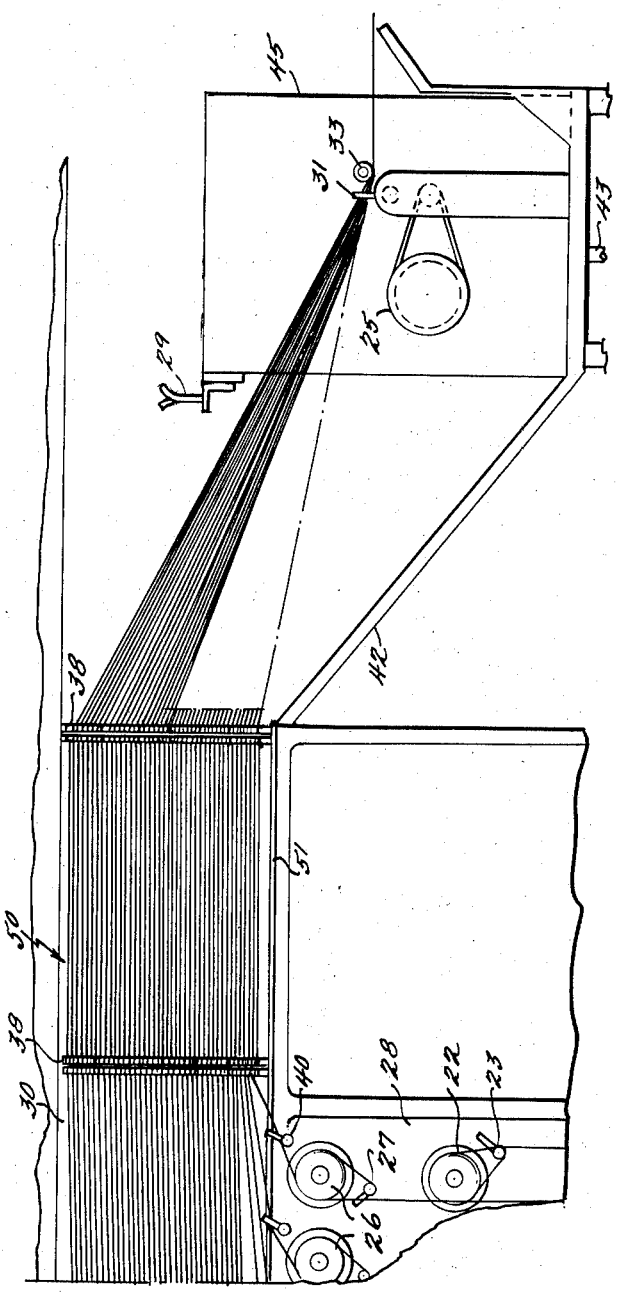
FIG. 4b.
FIG. 5b.
INVENTORS
RUDOLPH S. BLEY
RALPH H. CARTER
DONALD J. EDGAR
LA VERNE R. GRAYBEAL
KNUTE M. SCHMIDT
BY
ATTORNEY

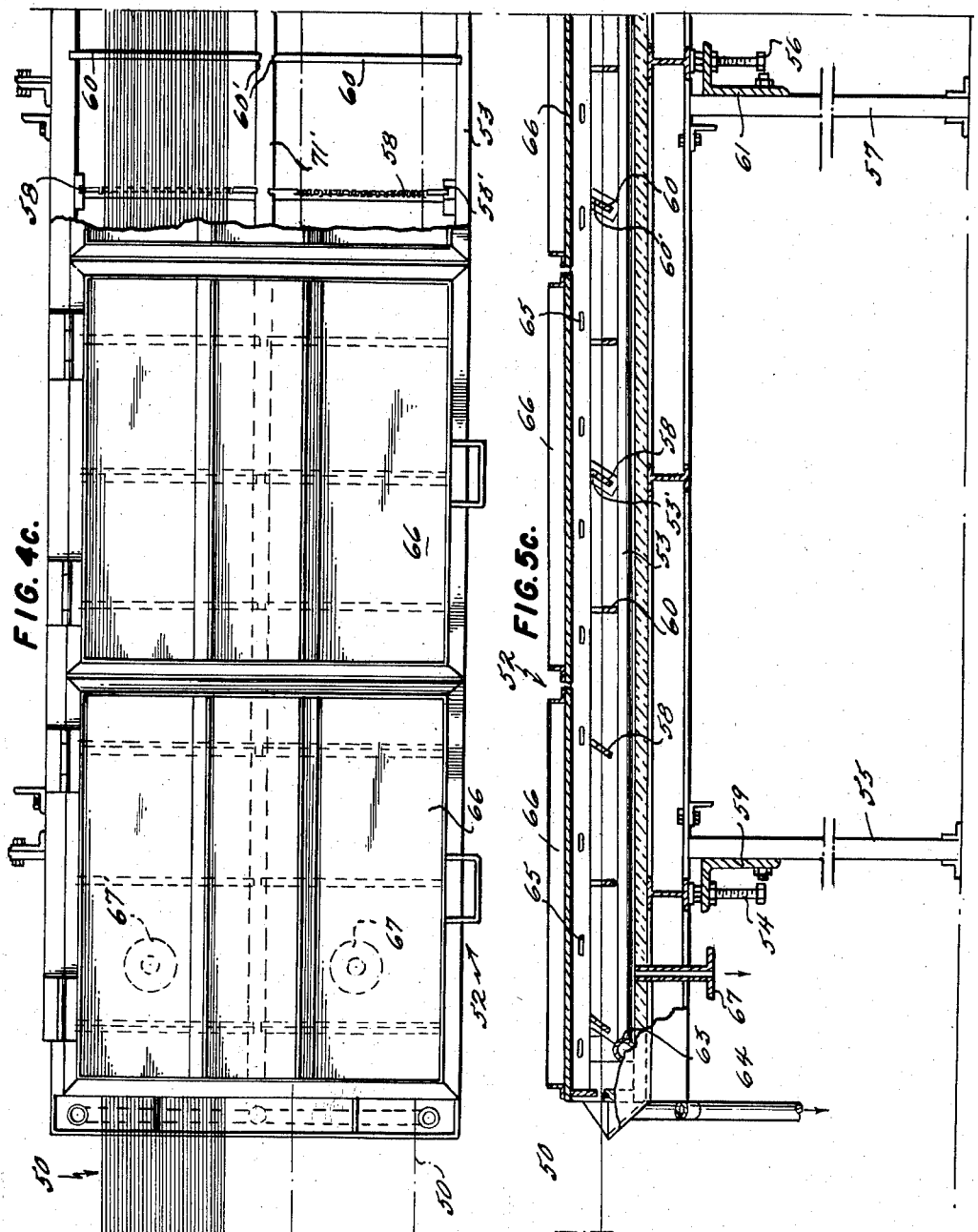

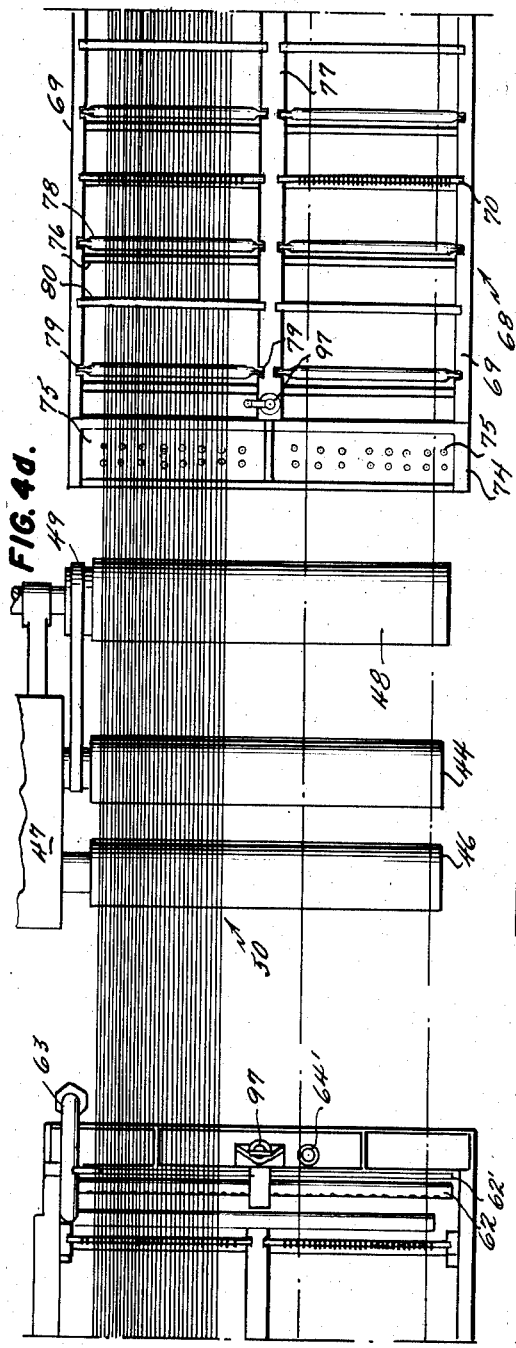
INVENTORS
RUDOLPH S. BLEY
RALPH H. CARTER
DONALD J. EDGAR
LA VERNE R. GRAYBEAL
KNUTE M. SCHMIDT

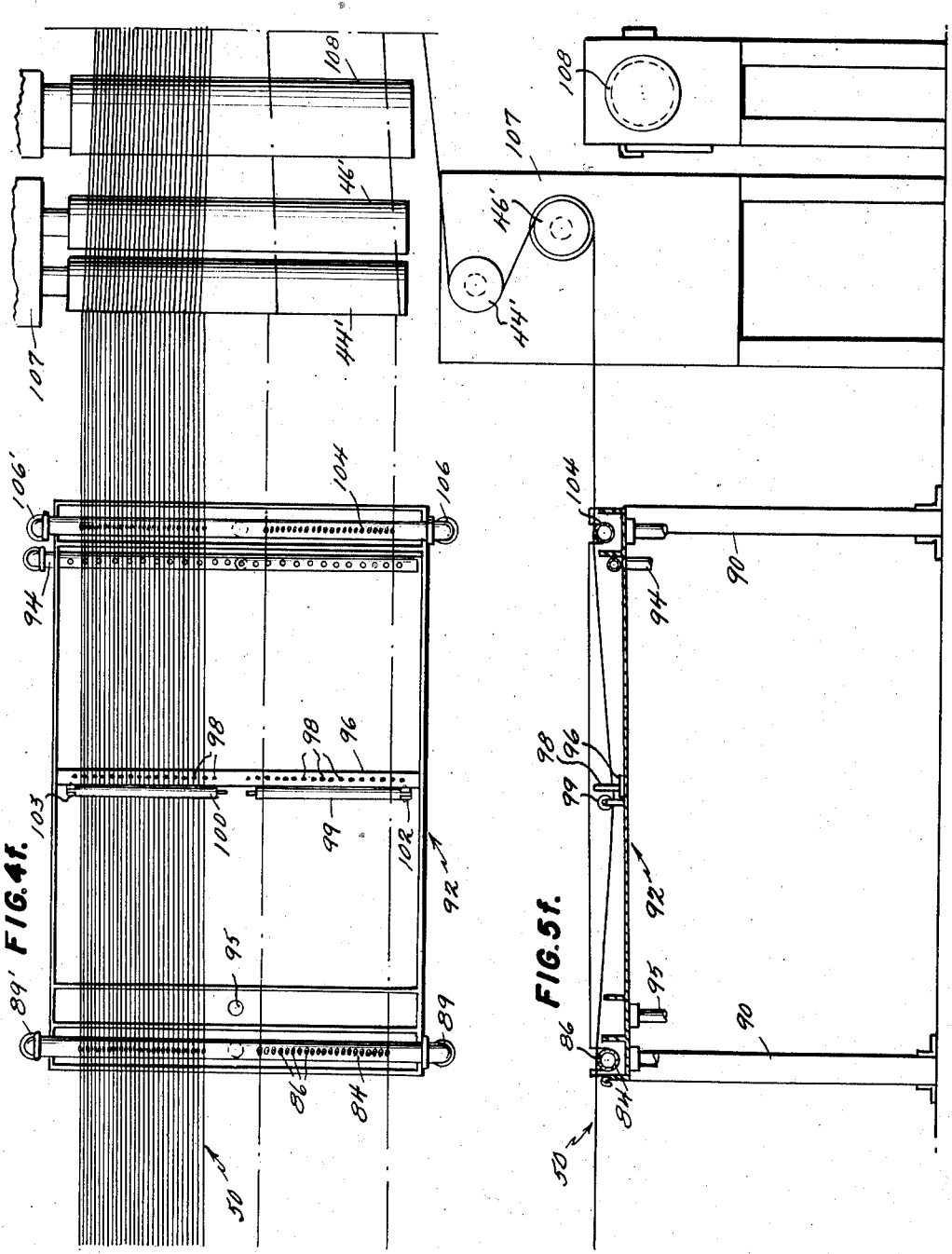

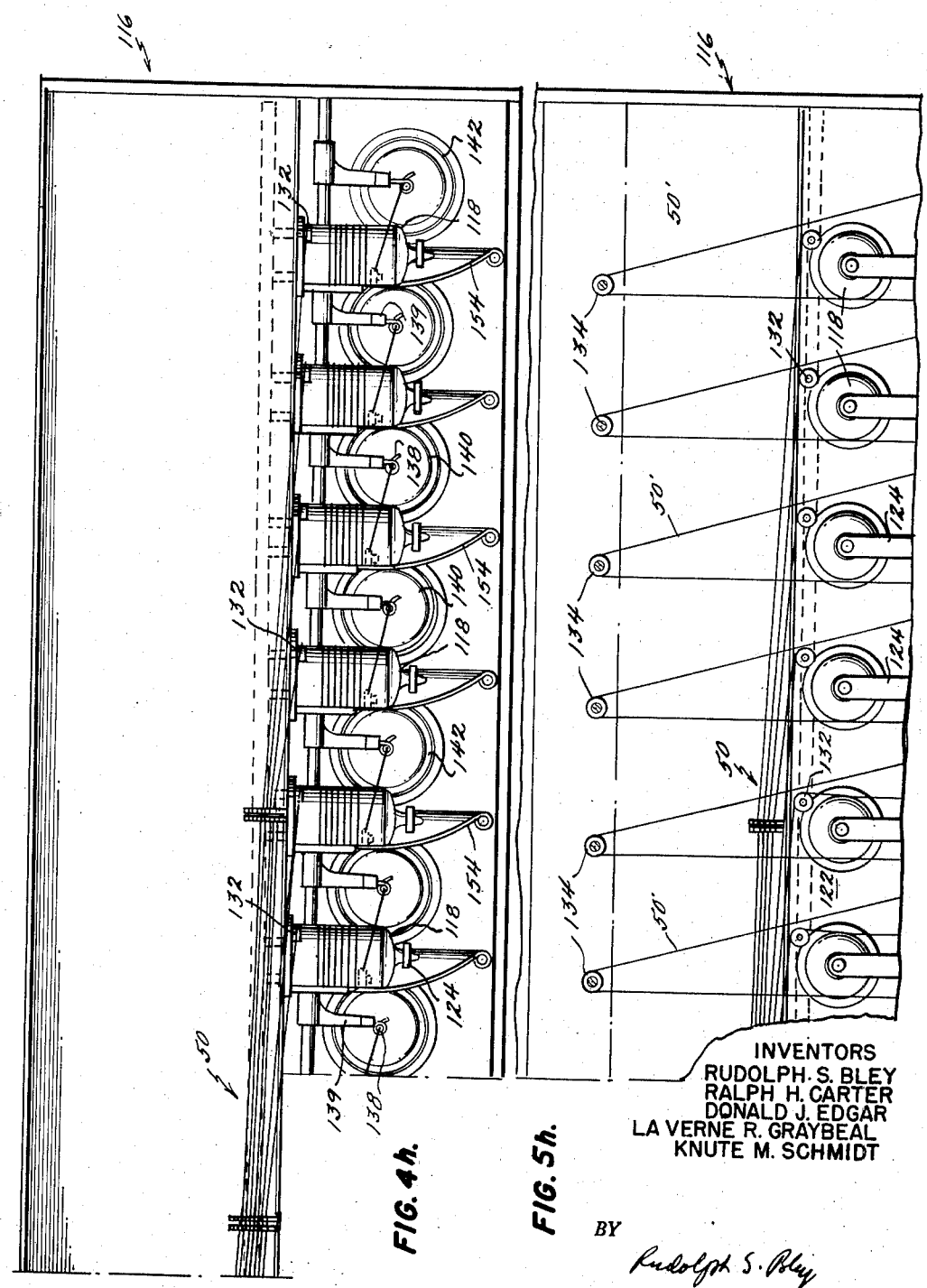

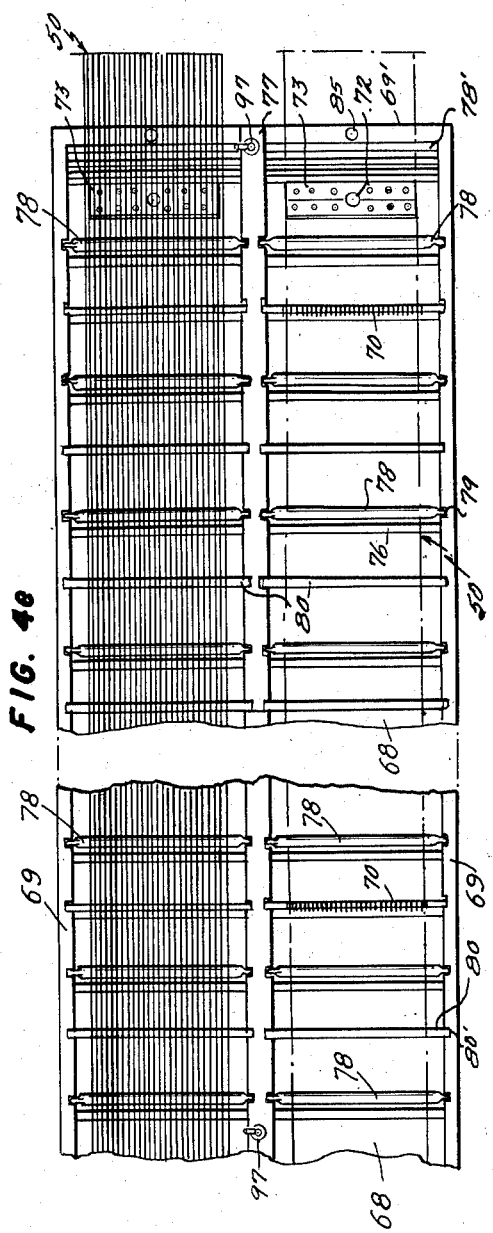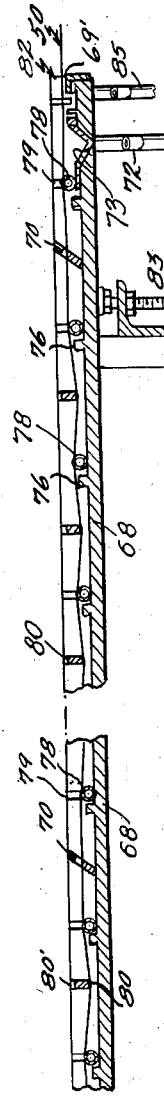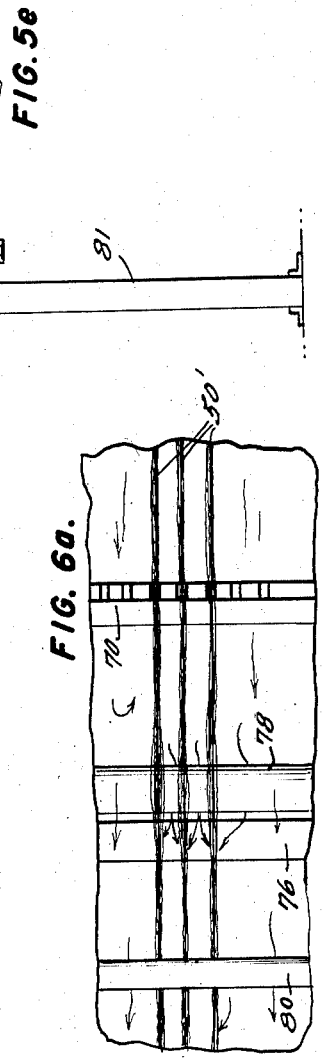

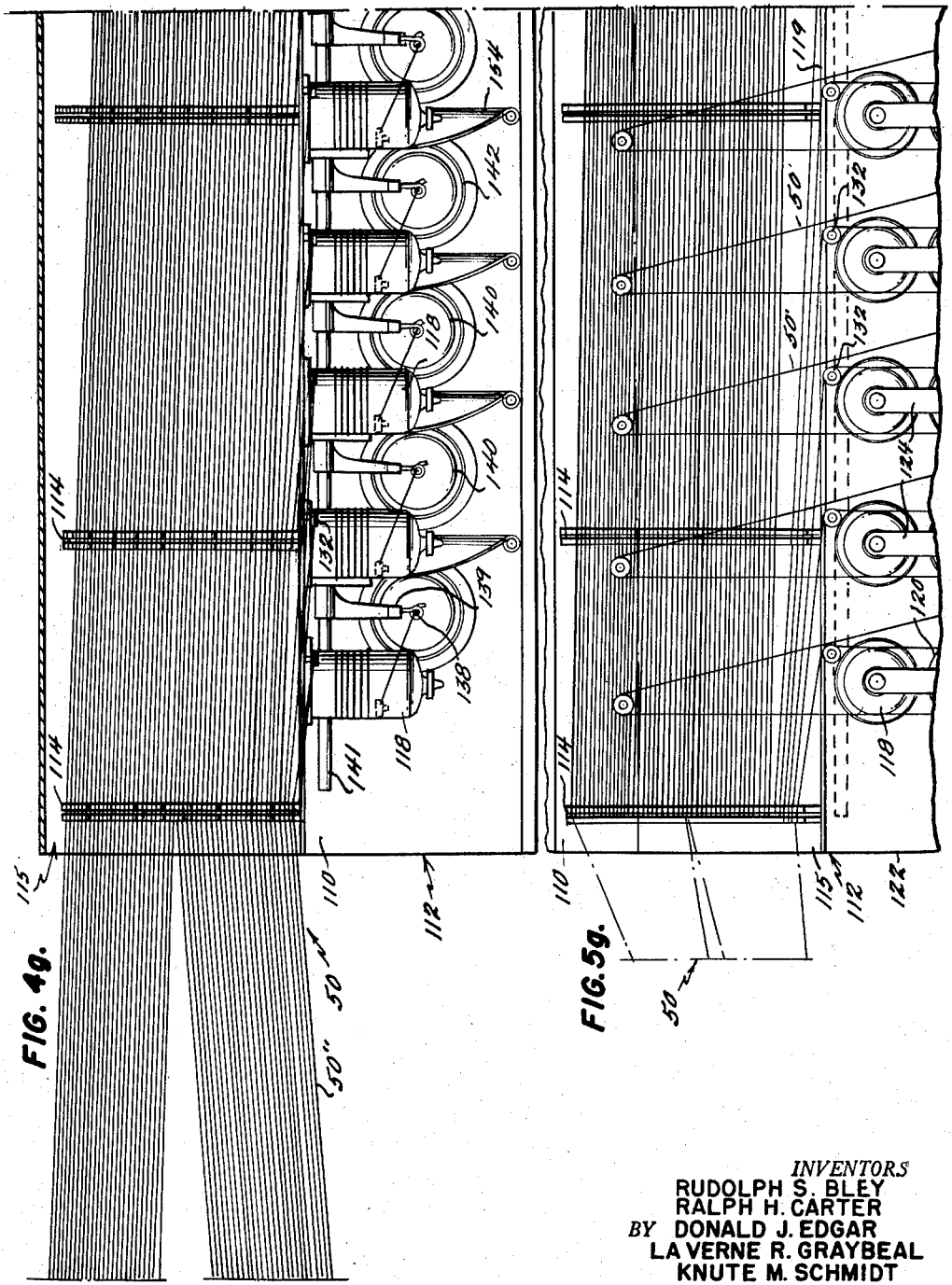

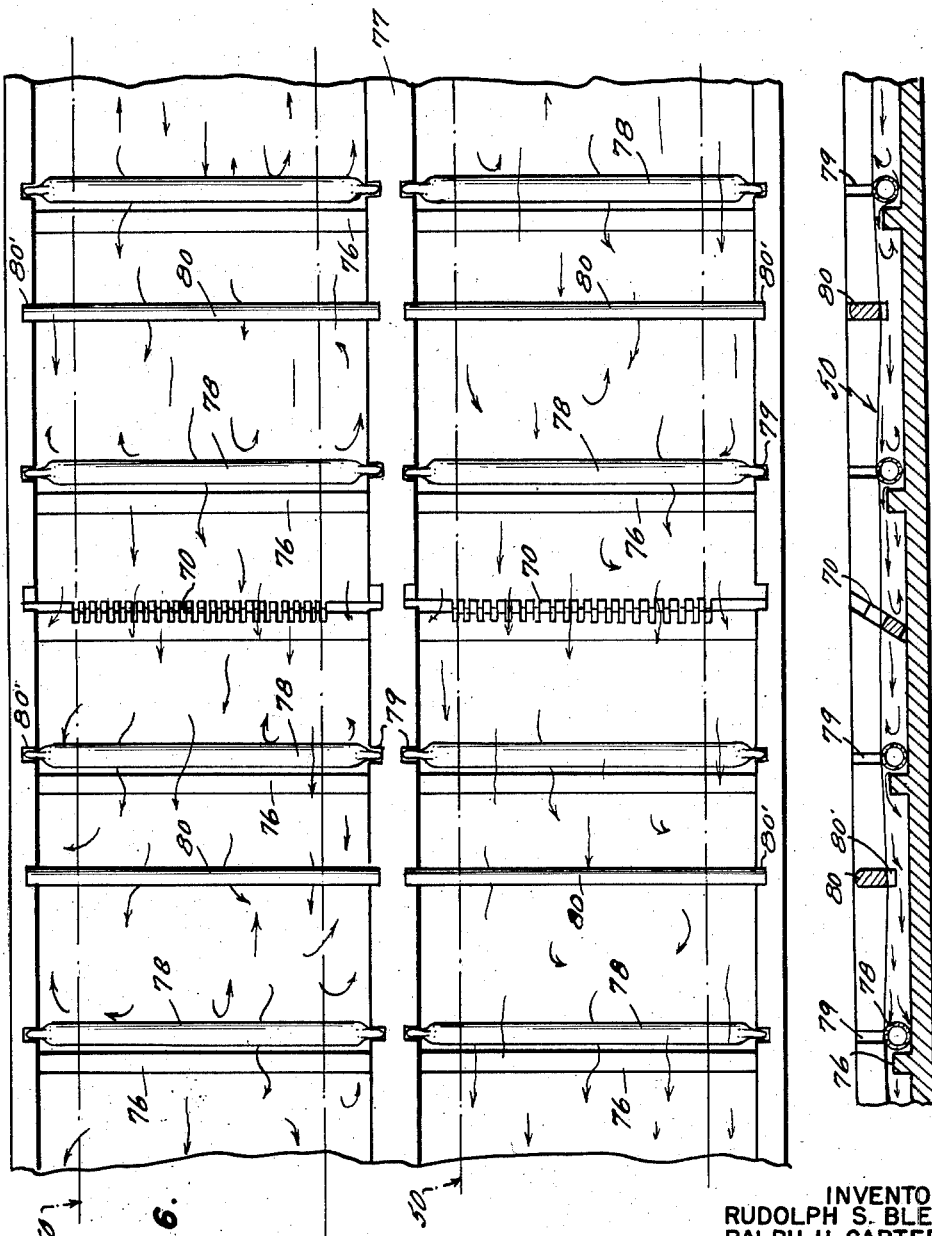

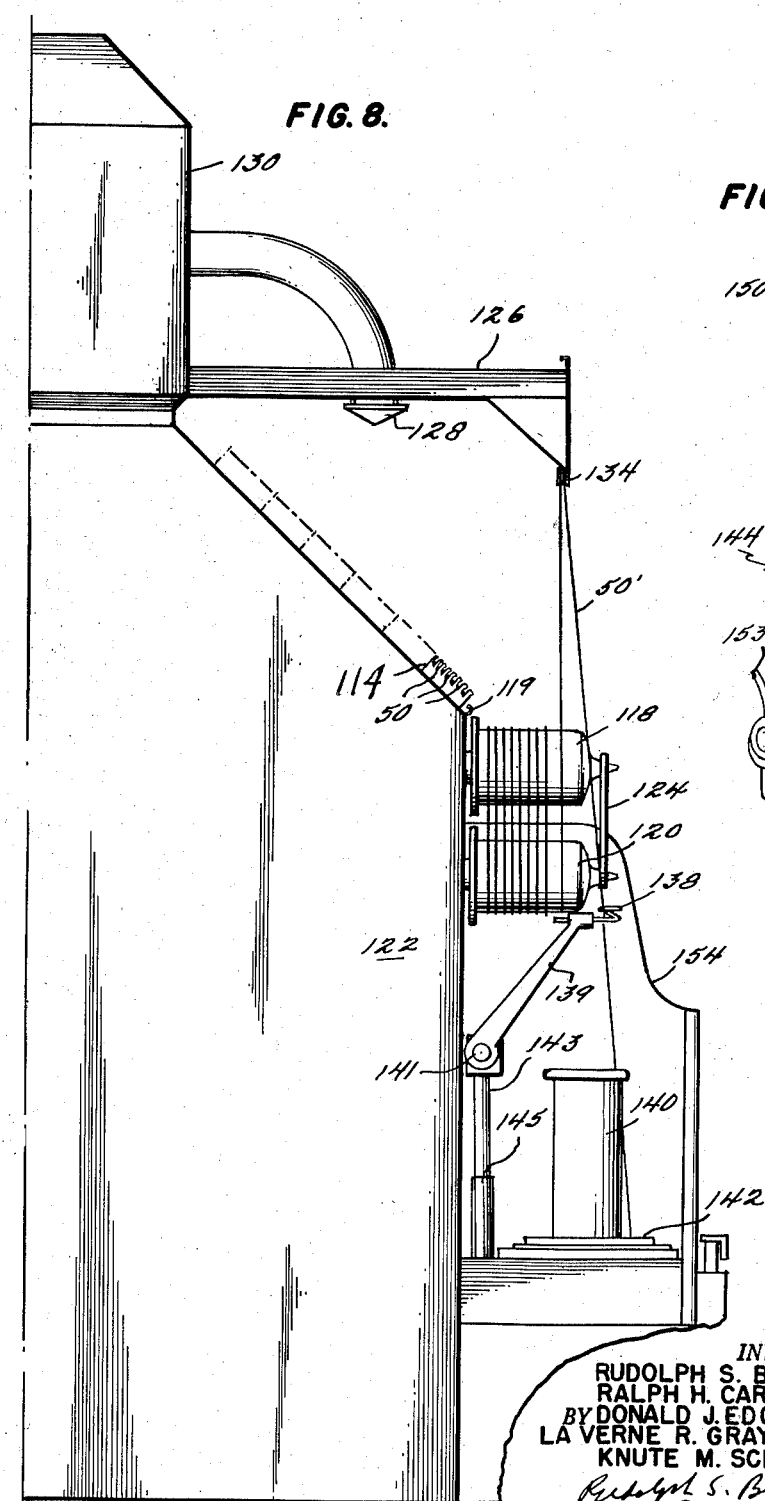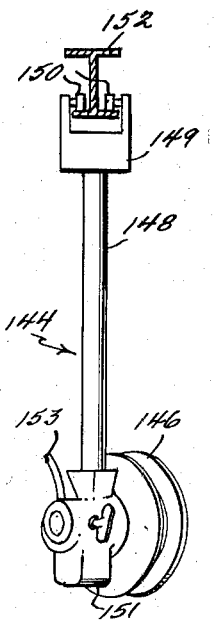

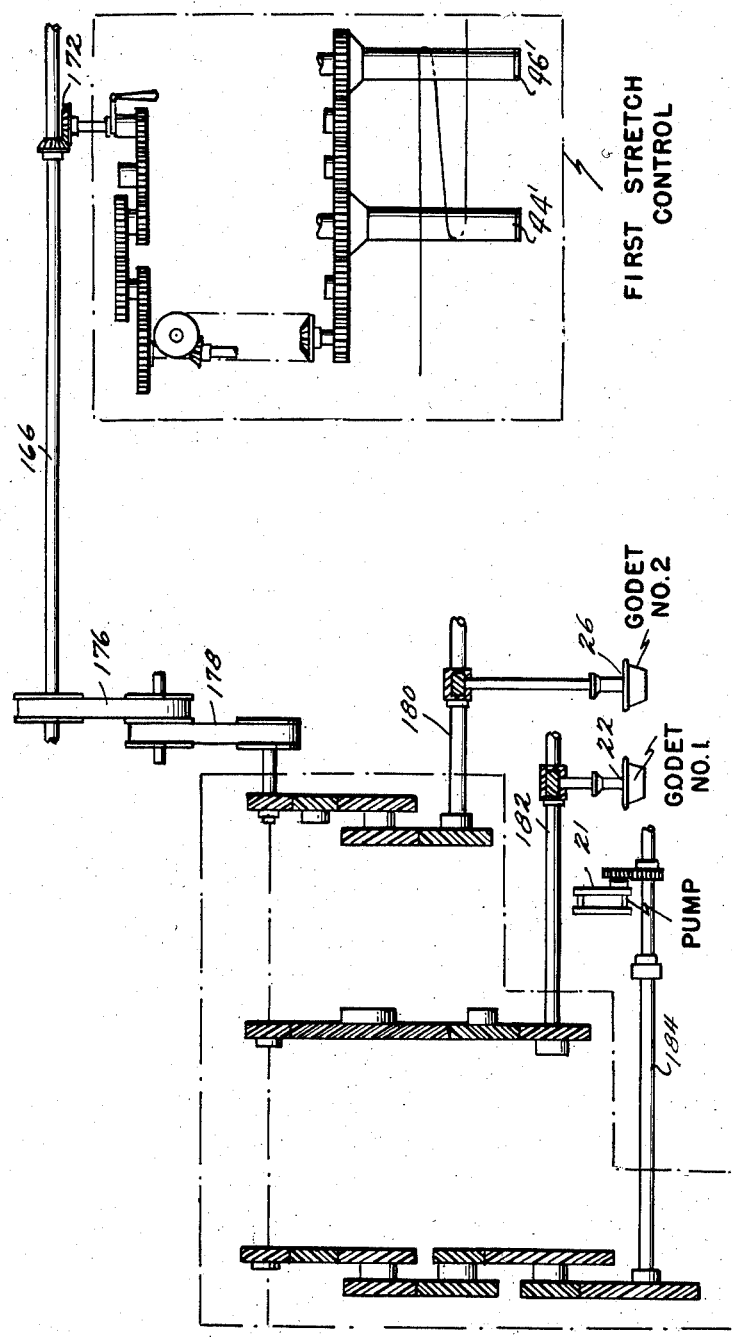

Aug. 11, 1959  
R. S. BLEY ET AL  
2,898,627  
PROCESS AND APPARATUS FOR THE CONTINUOUS  
PRODUCTION OF SYNTHETIC THREAD  
Filed Oct. 30, 1953  
15 Sheets-Sheet 15
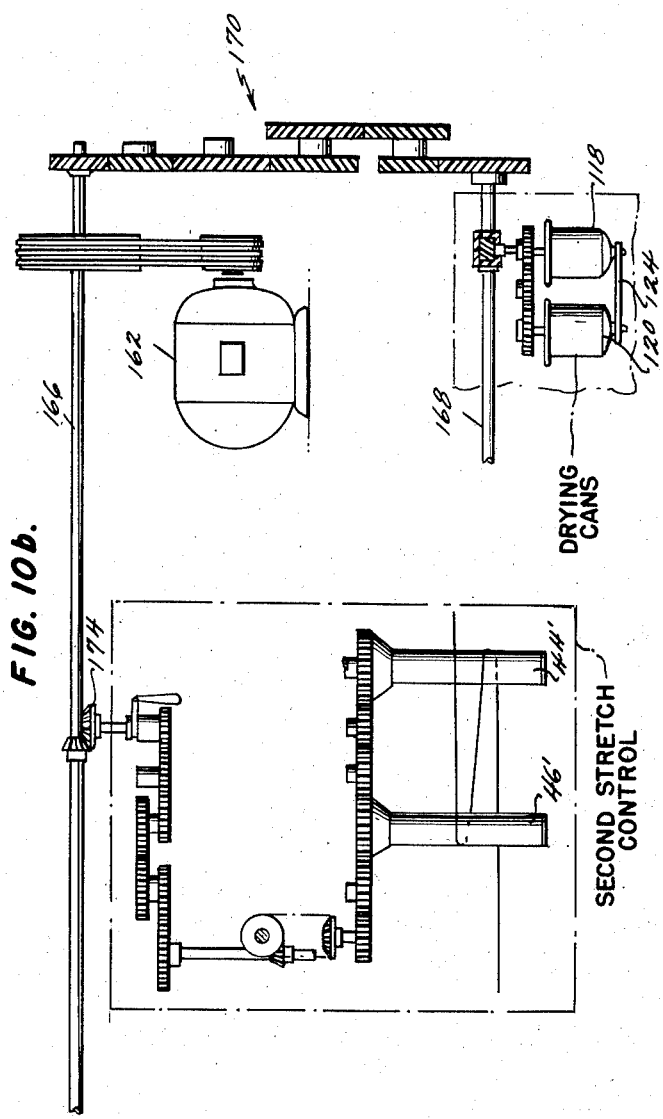
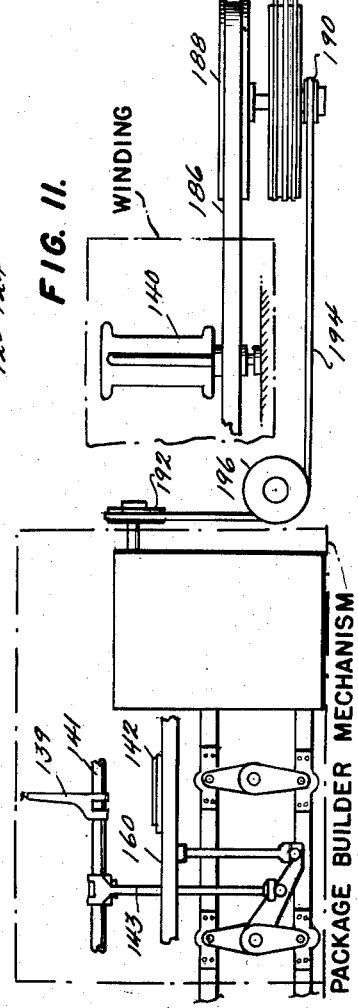
INVENTOR  
RUDOLPH S. BLEY  
RALPH H. CARTER  
DONALD J. EDGAR  
LA VERNE R. GRAYBEAL  
KNUTE M. SCHMIDT  
BY  
Rudolph S. Bley  
ATTORNEY

United States Patent Office 2,898,627
Patented Aug. 11, 1959

2,898,627

PROCESS AND APPARATUS FOR THE CONTINUOUS PRODUCTION OF SYNTHETIC THREAD

Rudolph S. Bley, Milligan College, Ralph H. Carter, Johnson City, and Donald J. Edgar, Elizabethton, Tenn., La Verne R. Graybeal, Asheville, N.C., and Knute M. Schmidt, Elizabethton, Tenn., assignors to North American Rayon Corporation, New York, N.Y., a corporation of Delaware Application October 30, 1953, Serial No. 389,421

7 Claims. (Cl. 18—8)

The present invention is concerned with a process and apparatus for the continuous production of synthetic threads. More particularly the present invention relates to a process and apparatus for the production of high tenacity rayon threads by the viscose process suitable for use as reinforcements in rubber tires.

The patent literature is replete with methods and apparatus for the continuous production and treatment of synthetic fibers, in particular those cellulosic fibers produced by the wet spinning process from viscose. From the very beginning it was recognized that a number of unique advantages would accrue if synthetic thread could be produced, treated, and packaged in a continuous manner. For a number of reasons which are well known in the art to which this invention pertains, the continuous production of synthetic threads in this fashion did not prove to be feasible, and the so-called discontinuous method of producing synthetic thread of cellulosic origin was generally resorted to. In this method, the freshly spun threads are wound on spools or deposited in centrifugal pots after which the individual spools or cakes from the pots have to be subjected to the various after-treating steps of washing, desulphurizing, etc. This discontinuous method obviously possesses a number of disadvantages, aside from the increased cost due to the excessive manipulative steps required. The freshly formed filaments often become damaged in handling in this fashion and considerable loss results, plus the fact that it is very difficult to produce thread from day to day having uniform properties when the threads are treated in separate batches.

More recently several processes have obtained some commercial success in the continuous production of synthetic thread of cellulosic origin. It is apparent to those skilled in the art that the simplest continuous method of manufacturing rayon thread would involve the formation of the thread from a spinning solution and the passage of the newly formed thread to packaging means substantially in a straight line, with the freshly formed thread being subjected to the various steps of washing, desulphurizing, etc. between the point of formation and the point of packaging. A number of attempts to produce rayon thread in this fashion continuously are disclosed in the patent literature, but for various reasons most of these efforts have not been entirely crowned with success.

Patent No. 2,587,619 to Hofmann, issued March 4, 1952, discloses and claims one such process and apparatus which has proven highly successful in commercial practice, and the present invention relates to certain modifications and improvements in the process and apparatus disclosed and claimed in this patent.

It is therefore an object of the present invention to provide a process and apparatus for the continuous production of synthetic threads and the like in a continuous manner. More particularly the present invention is concerned with certain improvements and modifications to the apparatus disclosed in the aforesaid Hofmann patent whereby high tenacity threads of cellulosic origin having improved physical characteristics can be produced continuously by the viscose process.

A still further object is to provide a method and apparatus whereby a multiplicity of threads may be produced in side by side relationship and successively joined at a point above the coagulating bath in the form of a spaced coplanar band, in which form they may be simultaneously subjected to common after-treating liquids while under controlled tension, after which the threads are individually, and successively disassociated from the coplanar band and individually dried and packaged.

A further object of this invention is to provide an improved process and apparatus for the continuous and simultaneous production of a plurality of heavy denier, multiple filament threads wherein the threads are passed side by side through treating troughs that are provided with means for spreading the threads into permeable ribbons so that the treating liquids passing through said troughs in a periodically upsurging manner enter and penetrate the permeable ribbons to thoroughly treat the same, the threads thereafter being fed to a combined drying and tension control device which feeds them under controlled tension to the twisting spindles.

Another object of this invention is to provide an improved process and apparatus for the continuous production of synthetic threads wherein a plurality of threads are produced and treated simultaneously and continuously, said threads being so arranged in the course of their production and treatment that they may be thereafter and without interruption simultaneously dried and fed, under the proper tension, by the drying devices, into the twisting and packaging spindles to produce thread of uniform quality.

Still another object of this invention is to provide an improved process and apparatus for the continuous production of synthetic threads wherein the threads are arranged side by side over one or more relatively long troughs for exposure to treating liquids flowing in a periodically upsurging manner therethrough, and during the course of this exposure the threads are each caused to assume the configuration of a permeable, flat ribbon whereby each and every filament of each of the threads is thoroughly exposed to the action of the treating liquids in a minimum of time.

In more detail, the object of the present invention is to provide a highly efficient simplified apparatus whereby a plurality of synthetic threads may be produced in side by side relation and simultaneously subjected continuously to the various after-treatments, dried and packaged either twisted or untwisted. To this end, the invention contemplates the provision of means whereby the individual threads are directed at substantially right angles from the point of extrusion in the form of a spaced coplanar band, positioned so as to be easily accessible to the operator at all times without employing a complicated and devious arrangement of mechanical parts to effect this result.

While the method and apparatus of the present invention is of the type disclosed in the previously referred to Hofmann patent, a number of important modification and improvements have been effected which will become apparent from the discussion of the invention which is to follow.

As stated, the modifications and improvements effected provide a machine particularly adapted for the production of high tenacity viscose rayon thread suitable for use as tire cord, and the discussion of the method and apparatus which follows is directed toward this preferred application of the invention. It is to be understood however that the scope of the invention is not to be so restricted, since any synthetic material adaptable to the wet spinning process can be utilized in connection with the improved method and apparatus of the present invention. For example, textile quality yarns from viscose or cuprammonium can also be produced. Examples of other synthetic materials capable of being wet-spun in this manner are arylonitrile and polyvinyl alcohol. Where the pure synthetics are being produced, the sequence of aftertreating steps might have to be modified along with the treating liquids employed to fit the requirements of the fiber being produced.

As in the aforesaid Hofmann patent, the present invention contemplates the provision of apparatus in which a large number of threads are initially formed, treated, dried, and packaged continuously and simultaneously, the threads being constantly visible and accessible from the first point of extrusion to the point of packaging to permit ready inspection and correction in the spinning or treatment of one or more of the individual threads, also each thread is subjected to the same treating conditions throughout the operation. The apparatus of the present invention permits the convenient and rapid stringing up of a large number of threads simultaneously at the inception of a period of operation, as well as the selective stringing up of individual threads or groups without interfering with the other threads being produced. The threads are produced, treated and packaged in a straight line operation so that a large conservation of space is possible in addition to permitting a uniform variable tension to be exerted on the individual threads during the aftertreatment.

In the drawings:

Figure 2 is an enlarged end elevational view, partly broken away, of the spinning end of the machine showing in detail the path of travel of the thread from its point of extrusion to its being joined in the coplanar band.

Figure 3 is an enlarged perspective detail view of a portion of one of the separating and guiding combs which are disposed on the spinning deck and the drying deck.

Figure 4a is a plan view partly in section, showing the top draw-off godets and a portion of the spinning deck illustrating the manner of forming the coplanar band of threads.

Figure 1:
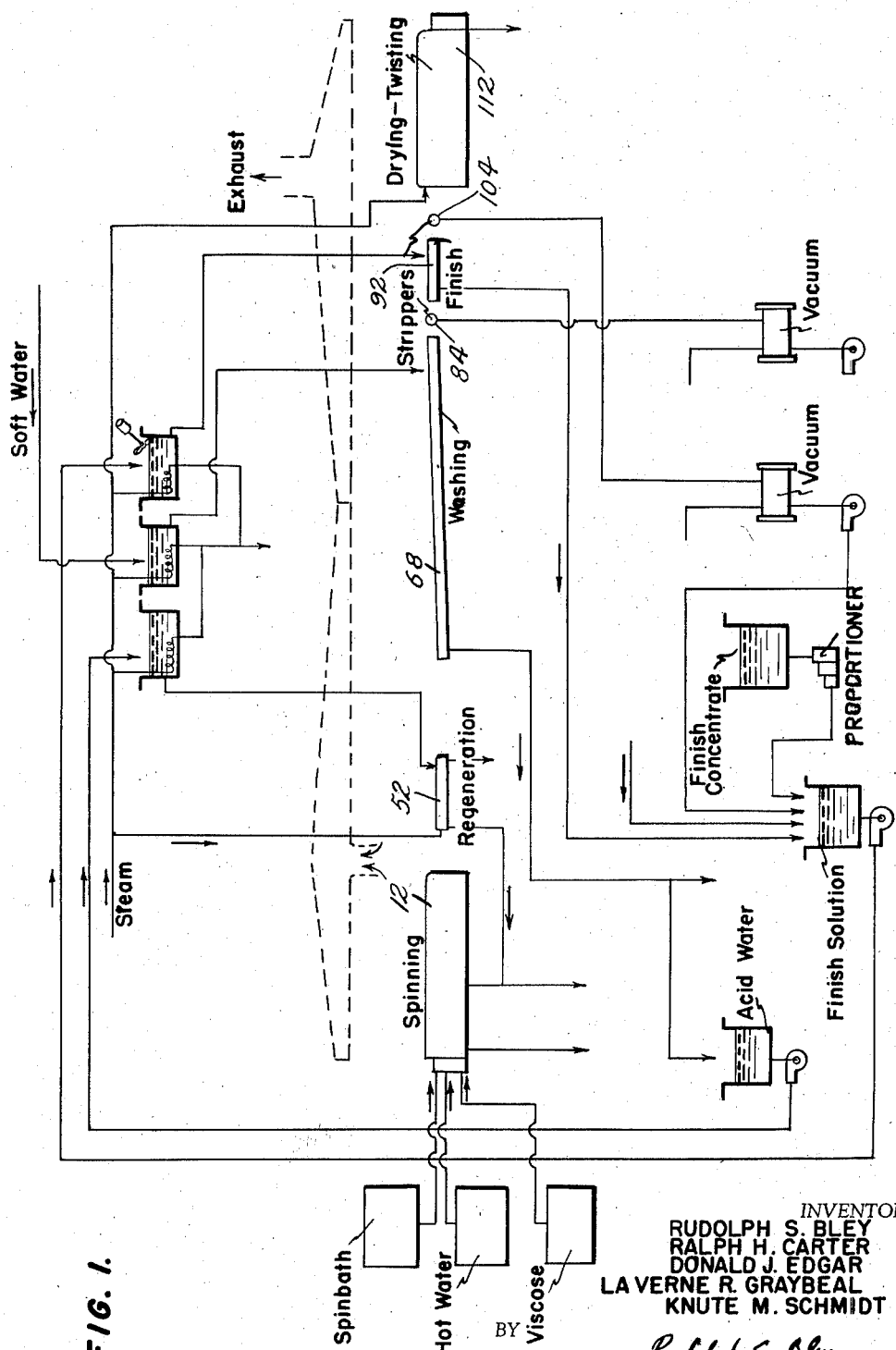
Figure 1 is a flow diagram of the entire machine showing the manner and mode of supplying the necessary agents to the machine for spinning, aftertreating, finishing, drying and packaging.

Figure 4b is a plan view partly in section, showing the end of the spinning portion of the machine shown in Figure 4a with the last two threads from their respective spinning stations being joined with the coplanar band on the spinning deck. The waste take up roller employed while threading up the machine is also shown along with the thread guide and separator comb spaced adjacent to the regeneration trough.

Figure 4c is a fragmentary plan view of a portion of the covered regeneration treating trough linearly disposed in the path of travel of the coplanar band of threads being delivered from the spinning deck of Figure 4b.

Figure 4d is a fragmentary plan view showing the end of the acid regeneration trough of Figure 4c, the first pair of tensioning rollers, the broken thread take up roller and the front portion of the open liquid aftertreating trough in line therewith.

Figure 4e is a fragmentary plan view of the rear portion of the liquid aftertreating trough, part of which is shown in Figure 4d.

Figure 4f is a fragmentary plan view showing the finish trough, in line with the wash trough of Figures 4d and 4e, the second pair of tension rollers, and the second waste take up roller used in stringing up the threads.

Figure 4g is a fragmentary plan view of the front portion of the drying and packaging section of the machine with the overhanging canopy broken away, so as to show the passage of the threads across the drying deck.

Figure 4h is a fragmentary plan view of the end portion of the drying and packaging section of the machine shown in Figure 4g.

Figure 5a is a partial sectional elevation of the portion of the machine shown in Figure 4a.

Figure 5b is a partial sectional elevation of Figure 4b.

Figure 5c is a longitudinal vertical section through the portion of the regeneration trough shown in Figure 4c.

Figure 5d is a longitudinal vertical section of the portion of the machine shown in Figure 4e.

Figure 5e is a longitudinal vertical section of the portion of the machine shown in Figure 4e.

Figure 5f is a fragmentary side elevation of the finish trough, and a side elevation of the second tension rolls and waste take up rolls shown in Figure 4f.

Figure 5g is a fragmentary side elevational view of Figure 4g.

Figure 5h is a fragmentary side elevational view of Figure 4h.

Figure 6 is a fragmentary enlarged plan view of a section of the aftertreating trough shown in Figures 4d and 4e respectively, illustrating the relative positions of the dams, depressor bars, the separator combs and the circumvoluted path of travel of the treating liquid.

Figure 6a is an enlarged fragmentary plan view of a section of the trough shown in Figure 6 showing the ribbon like configuration assumed by the threads in their passage through the wash trough.

Figure 7 is a detailed longitudinal vertical sectional view of a portion of the treating trough shown in Figure 5e.

Figure 8 is an end elevational view of the drying and twisting deck looking from the entrance end of the coplanar band showing one of the pairs of drying drums and a packaging bobbin.

Figure 8A:
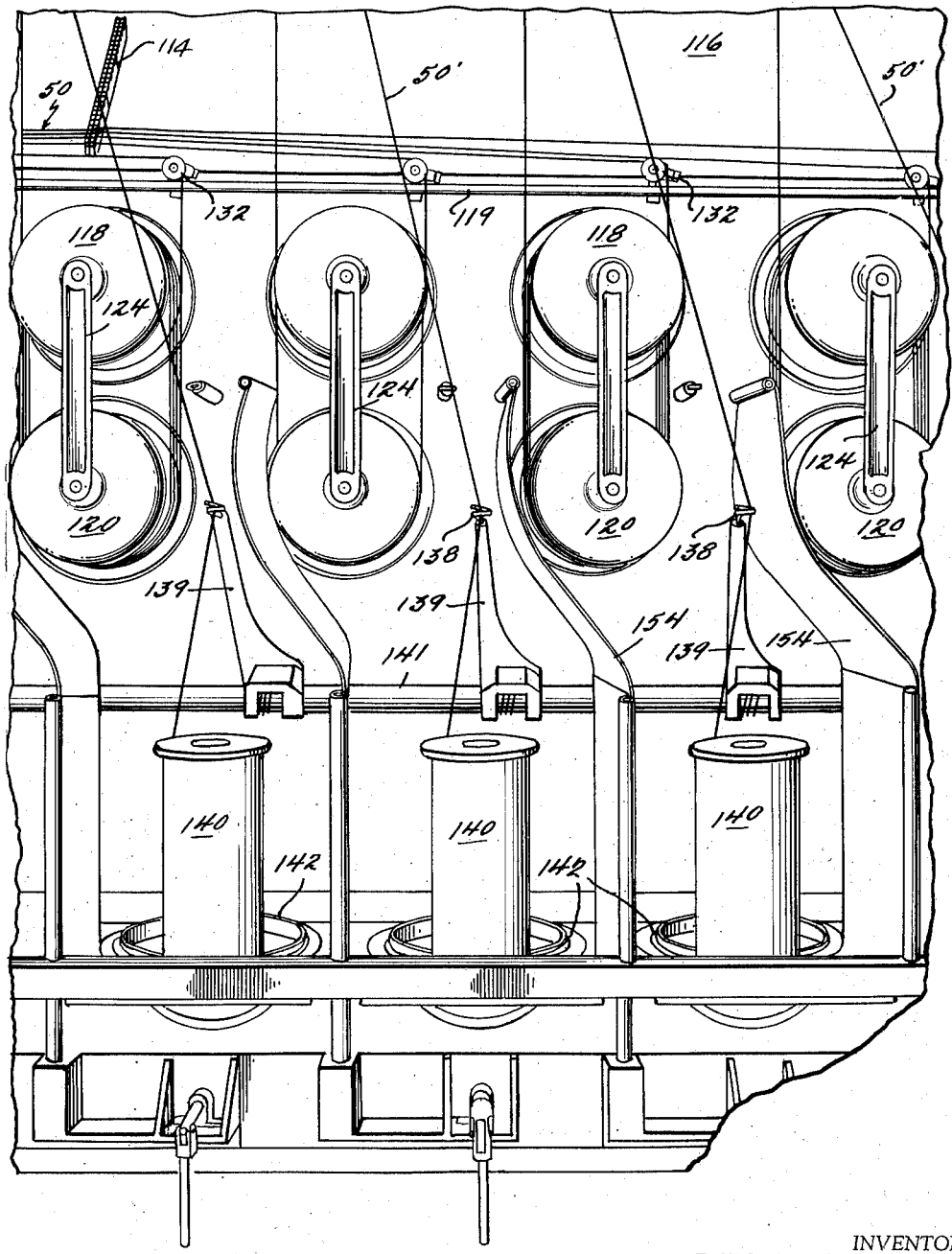

Figure 8a is a front elevational view of the drying and twisting deck showing the position of the shields and the path of travel of the threads from the drying and twisting deck to the packaging bobbins.

Figure 9 is a side elevational view showing the waste take up reel which is normally disposed adjacent to the packaging bobbins for receiving the threads while the bobbins are being doffed or threaded up.

Figure 10a is a schematic layout of a portion of the drive arrangement for the various driven members of the machine.

Figure 10b is a continuation of Figure 10a.

Figure 11 is a schematic layout of the drive for the winding bobbins and the package builder mechanism.

Referring more specifically to the drawings, a complete machine for producing viscose rayon threads according to the preferred embodiment of the present invention is shown in Figure 1 in the form of a flow sheet. Spin bath, hot water, and viscose is supplied from suitably positioned tanks, as shown, to the spinning station or portion of the machine 12 (Fig. 2). The freshly formed threads in the form of a coplanar band are led through the regeneration trough 52 (Figs. 4c and 5c) which is supplied with steam and hot acid water and upon emerging from trough 52, the threads pass through the wash trough 68 (Figs. 4d and 5d) and across the first vacuum stripper 84 (Figs. 4f and 5f), through the finish trough 92 and across the second vacuum stripper 104 to remove excess finish. The washed and finished threads are then moved to the drying and twisting station 112 (Figs. 4g and 5g), where the threads are individually dried under controlled tension and packaged ready for shipment.

As previously indicated the machine of the present invention is designed for use with the wet spinning process and the machine and process will be described in connection with the spinning of viscose. Referring now to Figure 2, the extruding and draw-off portion of the spinning section is more or less conventional in the art of viscose spinning. However, in order that the novel features of the present invention may be fully appreciated and understood by those skilled in the art, the single spinning position of Figure 2 will be described in some detail, with the understanding that the remaining spinning positions are identical therewith.

A candle filter unit 14 is provided through which the properly prepared viscose solution is subjected to the last filtering step before being extruded. Goose-neck delivery tube 16 carries the viscose from the candle filter contained in the unit 14 into the tank 18 which is normally partly filled with a circulating coagulating solution comprised of sulphuric acid, sodium sulphate and zinc sulphate in the preferred process of the present invention. Minute quantities of other ingredients may likewise be present in the spin bath in a manner which is generally understood in the art to which this invention pertains.

Goose neck 16 is provided at its free end with the upstanding conventional viscose spinnerette 20 through which the viscose is extruded in the form of threads, the diameter of which is determined by the quantity of viscose extruded. Draw-off godets 22 remove the freshly formed threads from the spin bath tank 18 over stripper guides 23, whereupon the threads are led into the hot water bath of tank 24 and then around the second stretch godets 26 and stripper guides 27, with a suitable stretch being imparted to the freshly formed threads between the two stages. This portion of the spinning arrangement is substantially as described in U.S. Patent No. 2,192,074 to Givens, and as previously stated is more or less conventional in the rayon art where high tenacity thread is being produced.

In the preferred embodiment of the present invention, forty-eight (48) such spinning positions are arranged in side by side fashion for each machine with two such units being preferably arranged in back to back relationship to form a complete machine.

Draw-off godets 22 and 26 are mounted on the forwardly inclined portion 28 of the spinning section of the machine and are each driven by means disposed behind the wall section 28 (Fig. 10a). The slant of section 28 permits the positioning of godets 22 and 26 for easy accessibility without danger of the threads being handled becoming entangled. Section 28 is joined to the inclined spinning deck 30 upon which each of the threads is led from the last godet 26 in a manner to be subsequently described.

The spinning deck and treating stations hereinafter described has the canopy 32 extending thereover and is provided with a series of exhaust ducts 34, one of which is shown in Figure 2, for removing the noxious fumes and vapors which are released during the step of regeneration. The exhaust ducts 34 discharge into the large exhaust manifold 36 which extends the length of the spinning section of the machine.

The spinning deck 30 is provided with a series of thread separating and guiding combs 38, a portion of one pair being shown in detail in Figure 3. These hooked comb members are arranged on the spinning deck in an ascending order of width from a point adjacent to the first spinning position to the end of the spinning deck. It will be noted from Figure 3, that the combs 38 are paired together in abutting relation with the hooked portion of the two combs facing in opposite directions so that once positioned, accidental displacement of the threads from the combs becomes practically impossible. The pairs of combs are mounted on the angle irons 39 by means of suitable bolts 41, with the sections of angle iron being secured on the spinning deck by welding. The combs are spaced on the spinning deck at sufficient intervals to insure that the threads are properly guided and supported at all times.

Referring to Figures 4a and 5a, the freshly formed threads after being extruded, stretched, hot water treated and again stretched are each led from the upper godets 26 through the Y shaped thread guides 40, adjustably mounted at the upper end of portion 28, and through the combs 38, with each thread having its individual comb position. Each thread is successively led to its position in the combs 38 until a spaced coplanar band of 48 thread ends, in the preferred embodiment of the invention, is formed. Of course, the machine dimensions can be varied to accommodate a more or less number of threads. However, 48 threads has been found to be a convenient number to handle.

The last two pairs of combs 38 mounted on the spinning deck (Figures 4b and 5b) are of maximum width which in this instance is sufficient to hold forty-eight thread ends in a guided and separated condition. A small gutter 51 is provided at the lower end of spinning deck 30 to receive and carry off excess spin bath discharged from the freshly formed threads in their passage across the spinning deck. The spaced coplanar band of threads 50 is moved from the spinning deck in a downward path across the drip basin 42, which receives any residual regeneration bath which might be discharged from the threads.

Drip basin 42 extends beneath the thread band 50 in its passage from the spinning deck to the regeneration trough to be subsequently described, and is provided with the drain 43 for discharging the collected drippings. The lower flat section of the basin 42 is secured at one end to the frame 45, which also serves as a mount for the waste take up roller 25, which extends beneath the band 50 of moving threads. Roller 25 is activated during threading up of the machine to wind up the band of threads in the form of a tow during the time the threads are being placed on the spinning deck. Roller 25 is separately driven by means of an air motor (not shown).

Tow guide 29 is mounted on the upper corner of frame 45 for use in positioning the threads in the treating troughs to be hereinafter described. A straight toothed separator comb 31, through which the threads pass, is also mounted on the face of frame 45, and extends across the path of the band 50 to insure against the individual threads making contact with each other between the spinning deck and the regeneration trough, and to properly space the threads prior to entering the regeneration trough. Mounted adjacent to comb 31, and extending parallel therewith is the circular guide member 33, under which the moving band passes just prior to entering the regeneration trough. The guide 33 is positioned so as to cause the band to enter the regeneration trough at the proper level of contact with the hot dilute acid flowing therein, which will next be described.

Referring to Figures 4c and 5c, the coplanar band is subjected to a first aftertreatment which comprises contacting the threads with a hot acid regeneration bath to insure a thorough regeneration of the freshly formed threads. To accomplish this purpose a covered inclined shallow trough 52 is provided disposed with its long axis in the line of travel of the moving thread band 50. Trough 52 is inclined slightly upward from the point of entrance of the thread band 50 to the point of exit thereof, with adjusting screws being provided to vary the elevation of the trough as indicated at 54 and 56. The weight of trough 52 is borne by stanchions 55 and 57 with the adjusting bolts 54 and 56 being mounted on right angled members 59 and 61. Trough 52 is divided into two parallel sections by the center partition 71' extending the full length of the trough, with each section being of sufficient width to accommodate a series of separator combs 58, with each section accommodating one-half of the coplanar band of threads. Separator combs 58 are not hook shaped as are combs 38 and are singly spaced within the trough 52 by means of slotted members 53' secured to the side walls 53 of the trough. As indicated, the trough is of rather shallow depth and contains in addition to the combs 58 a series of spaced transverse dams 60, which periodically interrupt to a slight extent the flow of the hot acid treating liquid, imparting a certain turbulence to the liquid to better insure greater contact with the individual filaments comprising the threads of the coplanar band.

The thread band 50 moves across the top of the dams 60 and through the combs 58. The dams 60 are positioned transversely of trough 52 by means of slots 60' in the side walls 53 of the trough. The dams of trough 52 are rectangular members and do not rest on the bottom of the trough, but are positioned adjacent the surface of the reservoir of acid solution within trough 52, with their depth being determined by the length of slots 60'. Dams 60, while causing some turbulence in the treating liquid, serve the function of supporting the thread band 50 at the surface of the treating liquid.

The hot acid regeneration bath is introduced through the inlet pipe 62 which discharges at the elevated end of the trough 52 from which point the liquid flows by gravity down the trough counter-current to the movement of the thread band 50, and is discharged through outlet 64 in the lower end of the trough. In practice, hot dilute acid for the acid regeneration bath of trough 52 is derived from the treating water discharged from the washing trough to be hereinafter described. A series of hinged covers 66 are provided for the trough 52 so that the hot acid fumes are not discharged into the room and also in order that the elevated temperature of the treating bath can be better maintained.

The temperature of the hot dilute treating acid within trough 52 is maintained by means of the steam coil 63 which rests on the bottom of trough 52. Outlet ports 65 in one of the side walls of the trough provides a means for discharging the gases and vapors which accumulate within the cover trough 52. Drains 67 and 67' are provided on each side of the trough at the lower end thereof to permit the trough to be completely emptied when necessary. Also the inclination of the trough 52 is rather slight so that some of the liquid admitted through pipe 62 tends to overflow the end partition 62' into the area 71 from which the drain pipe 64' discharges. From the trough 52, the wet, fully regenerated threads move across the first pair of tension rollers to be next described.

Tension rollers 44 and 46 are mounted upon and extend outwardly from the support 47 across the path of travel of the band of threads 50. Rollers 44 and 46 are smooth surfaced but when threaded up as shown in Figure 5d, slippage of the threads is substantially obviated. Rollers 44 and 46 are driven from a common shaft extending the full length of the machine, as shown in Figure 10a.

Of particular importance to the efficient operation of the machine of the present invention, is the broken thread take-up roller 48, driven at a slightly greater speed than upper tension roller 44, by means of a suitable belt 49 connecting the two. Roller 48 is disposed beneath the moving band of threads 50 and normally has no contact with the moving band. Although the surface of the roller 48 is smooth in configuration, it is fabricated of material which possesses a rather high coefficient of friction so that, if one or more threads comprising the band 50 should break at any point beyond the roller 48, such thread or threads would no longer have tension thereon permitting it to fall from the plane of the band 50 on to the surface of the roller 48, which is being constantly rotated in the direction of travel of band 50. Roller 48 exerts enough friction on the broken wet thread or threads to cause it to be taken up thereon at substantially the same speed which the band 50 is being moved forward, thereby permitting the normal production and handling of the broken thread up to the roller 48. This is of considerable importance, since the broken filaments would ordinarily tend to wrap around the tension rollers 44 and 46 with likelihood of complete interruption of the normal production and movement of all the other remaining thread ends up to this point. Drip pans 45' 47' serve to catch the excess hot acid removed from the threads by tension rollers 44 and 46.

A second pair of tension rollers 44' and 46' is provided at a point linearly spaced from the rollers 44 and 46 (Figures 4f and 5f) which serve to move the band of threads 50 through the washing operation to be hereinafter described, as well as to adjust the tension on the band between the two sets of rollers. The tension rollers 44' and 46' are identical with rollers 44 and 46, and are driven from the same shaft, so that a predetermined increase or decrease of tension can be exerted on the moving band as it is passed through the various treating stations of the machine, the regeneration treatment having already been described.

The washing and desulphurizing trough 68 is constructed in general as described in Hofmann Patent 2,587,619. However important modifications in the arrangement of the dams and the separation of this portion from the regeneration trough have been effected. According to the present invention the shallow trough 68 is inclined relative to the direction of travel of the thread band 50, and is of more shallow construction than trough 52, with the side walls 69 being slightly higher than the depth of liquid to insure against side wall overflow. As in the case of regeneration trough 52, the trough 68 is divided into two sections by means of the middle partition 77, with each section being of sufficient width to accommodate 24 thread ends. The dams, depressors and guiding combs to be described are likewise divided to fit into each section. To insure proper guiding and separation of the individual threads comprising the band 50, a series of transverse combs 70 of the type used in the acid regeneration trough 52 are provided. Treating water or other suitable liquid is introduced through the inlets 72, see Figs. 4e and 5e, and is discharged in the upper end of the slanted trough 68 beneath the perforated plates 73 which form a V-shaped channel extending across the bottom of trough 68, from which point the fluid flows by gravity down the trough into the angled portion 74 at the lower end of the trough where it is collected through the strainers 75 and discharged through the outlets 75'. The perforated plates 73 act to spread the water to the proper depth as it is introduced into the trough.

Trough 68 is supported by stanchions 81 through the medium of adjusting bolts 83 so as to permit the elevation of trough 68 to be varied throughout the length thereof. A drain 85 is provided in the upper end of the trough adjacent end wall 69' for collecting any of the treating liquid which may be drawn upwardly in the trough by the moving thread band.

The delivery of treating water or other appropriate treating fluids to the trough 68 may be controlled by any desirable means, however a rotometer (not shown), conveniently placed so as to be visible to the operator is preferably employed for this purpose.

Since the free counter-current flow of the treating liquid does not insure proper contact and treatment of all the individual filaments comprising the threads of band 50, the flow of the treating liquid is periodically interrupted by means of the dams 76 and 78 which are disposed transversely of the trough 68 in each section thereof. Each of the dams 76 is permanently secured to the bottom bed of the trough 68, and are so designed that they do not project above the surface of the treating liquid. Adjacent dams 78 are conveniently inserted transversely of the trough by means of the slots 79 on the inner faces of the side walls of the trough and the middle partition 77. Dams 78 are spaced a fraction of an inch from the bottom of trough 68 by means of slots 79 and project to the surface of the flowing treating water. The treating liquid in its passage down trough 68 under gravity flow, tends to flow under the dams 78 and thence over the dams 76, there also being a slight flow over the tops of dams 78 under normal conditions. The interruption of the flow of treating liquid in this fashion serves to create a better turbulence in the trough 68 with a series of eddy currents occuring between each pair of dams. Thread band 50 is drawn through the trough by means of the tension rollers 44' and 46' in the manner as previously indicated, and the threads in their passage through the trough 68 ride on the surface of the dams 78 which are preferably of circular configuration. The adjacent dams 76 which lie below the surface of the stream of treating liquid are not contacted by the thread band, but their position causes the stream of fluid to be directed upwardly against the moving thread band.

A series of depressor bars 80 are provided to rest against the upper surface of the moving thread band 50, and at the point at which the depressor bars have contact therewith, the band of threads tends to dip slightly below the surface of the moving stream of treating liquid to insure that the thread band moves on the surface of the liquid otherwise. The depressor bars 80 are likewise held in position by means of slots 80' in inner side walls of the trough and the inner partition 77. In their passage through the trough 68, the individual filaments comprising each of the threads of the band are flattened out ribbon-wise through contact with the dams 78 and the depressor bars 80 as shown in Figure 6a, thereby further insuring intimate contact of the treating liquid with the individual filaments. The individual threads 50' of the thread band 50 are thus spread into relatively permeable ribbons by the action of the depressor bars 80 and the elevated dams 78, and subjected to the treating liquid surging upward through the narrow passages between the dams 78 and fixed dams 76 so that every filament of each thread 50' is thoroughly exposed to the treating liquid. The combs 70 positioned in the treating troughs at various intervals, in addition to maintaining the threads properly spaced, also function to keep the individual filaments of each of the threads gathered into the ribbon shaped threads. It should be emphasized at this point that the movement of the thread band through the acid regeneration trough 52 and the washing trough 68 is substantially always at the surface of the moving stream of liquid which flows countercurrent to the direction of travel of the band 50, except as previously indicated in describing the function of the depressor bars 80.

As heretofore pointed out, the washing and aftertreating trough 68 is disposed in line with the regeneration trough 52 and closely adjacent thereto. As in the case of trough 52, washing trough 68 is inclined with the lower end thereof being adjacent to the trough 52 to permit the gravitational flow of the treating liquid within trough 68. The circumvoluted flow of the treating liquid in its passage down the trough 68 to the discharge end 74 is illustrated in detail in Figures 6 and 7.

It will be noted that the band of yarn threads 50 upon entering the trough 68 first makes contact with treating liquid having a rather high impurity content with a pH on the acid side, since the fluid will have entered the trough through the inlet pipes 72 and flowed down the trough 68 in contact with the yarn threads throughout its passage. As the thread band 50 progresses up the inclined trough 68 it will be apparent that the threads progressively contact cleaner treating liquid so that upon reaching the upper end of the trough the thread band is contacted by the pure liquid entering the upper end of the trough, which effects the removal of substantially all of the remaining undesirable chemicals from the threads.

From the upper end 82 of the trough 68, the thread band is moved across the vacuum stripper 84 which is disposed across the path of the moving thread band, in line with the upper end of trough 68. Vacuum stripper 84 is comprised of a pipe of suitable diameter, and is connected at both ends at 89 and 89' to a source of vacuum. The vacuum pipe 84 is preferably constructed of stainless steel or other corrosion resistant material and is provided on its upper surface with a series of smooth surfaced slots 86 having small holes in the apex thereof communicating with the interior of pipe 84, with a slot being provided for each of the yarn threads to be moved thereover. A sufficient vacuum is maintained on the pipe 84 to insure the removal of the excess treating liquids adhering to the threads from their passage through the trough 68. The vacuum on the strippers can be regulated by monometers suitably placed for easy observation.

It will be noted in Figures 4f and 5f, that the vacuum stripper 84 is disposed at one end of the finish trough 92. Finish trough 92 is pan shaped with a slightly greater depth than the trough 68 and is inclined to a slight degree to permit a small flow of finish solution therethrough. The finish trough 92 is supported by the four stanchions 90. A constant level of finish solution is supplied to the trough 92 through the inlet pipe 94 and discharged through outlet 95 where it is delivered to be reconcentrated and recirculated in the manner shown diagrammatically in Figure 1. The flow of finish solution to the trough can be observed and regulated by the use of a sight gauge.

Disposed transversely of the finish trough 92, approximately medially thereof, is a separator and guiding comb 96 which is divided into two sections of straight teeth 98, sufficient in number so that an individual thread is permitted to pass between each of the teeth 98, with 24 threads being accommodated on each side. The separator comb 96 is conveniently secured to the bottom of the trough 92 by any suitable means such as welding. To insure thorough impregnation of the threads by the finish solution, a pair of hinged depressor members 99 and 100 are provided adjacent to the separator comb 96. For convenience in threading up the band through the finish bath the depressor elements 99 and 100 are hinged at 102 and 103 respectively in order that they may be raised up during the threading operation. A suitable latch (not shown) is provided so that the members 99 and 100 can be secured in their position over the moving thread band to insure total immersion of the moving band in the manner shown in Figure 5f, as well as to spread out the threads ribbonwise to some extent as they pass under the members 99 and 100.

In order to remove excess finish adhering to the threads, a second vacuum stripper 104, identical with stripper 84, is provided on the other end of the finish trough 92. The construction and arrangement of the stripper 104 is the same as that described in connection with the member 84. Stripper 104 is also connected to a source of vacuum at both ends by means of pipes 106 and 106'. The excess washing bath removed by stripper 84 is discharged from the vacuum tank as waste, with the excess finish removed by stripper 104 being returned to the finish solution storage tank.

As heretofore indicated, the machine of the present invention is conveniently constructed to produce and treat forty-eight thread ends simultaneously, with a similar machine contiguous therewith producing and handling a like number of threads. It will be noted from the previous description, that the thread band in its passage through the regeneration trough 52, washing trough 68 and finish trough 92, is divided for convenience into two sections of twenty-four threads each, with the various combs, depressor bars, dams and vacuum strippers being likewise arranged in two sections in order to accommodate this division. This arrangement of the thread band is primarily for convenience in threading up the moving band through the machine, and it should be emphasized that this feature is not necessarily essential.

From the last vacuum stripper 104 the moving thread band 50 is led around a second pair of tensioning rollers 44' and 46' previously described. The rollers 44' and 46' are mounted, and extend from the support 107 and are driven from the same shaft as rollers 44 and 46. By modifying the driving gear trains shown in Figures 10a and 10b, the two sets of rollers can be driven at different speeds. The waste take-up roller 108 is provided to permit the thread band to be completely strung up to the tension rollers 44' and 46'. The waste take-up roller 108 is separately driven by means of an air motor (not shown) and handles the thread band in the form of a tow prior to its being threaded around rollers 44' and 46' in the same manner as waste roller 25.

From the upper tension roller 44' the thread band 50 is led to the drying and packaging deck 110 of the drying and packaging section of the machine 112 (Figures 4g, 5g and 8). Arranged on the drying deck 110 are a series of pairs of spaced separator and guiding combs 114, identical with those described in connection with the spinning deck 30, except instead of being arranged in ascending order of width they are arranged in descending order of width from the end 115 of this section of the machine to the end 116, see Figs. 4h and 5h. For each of the forty-eight thread ends comprising the band 50, there is provided a pair of rotatable drums or cylinders 118 and 120, see also Fig. 8a, which also serve as thread storage and thread advancing cylinders.

The drums 118 and 120 are rotatably mounted on the face 122 of the drying and packaging section of the machine. The drums 118 may be heated by means of steam in a manner similar to the disclosure of U.S. Patent 16,905 or by electricity in the manner described in either of U.S. Patents 2,244,684 and 2,416,533. For convenience, the heat is supplied by means of steam in the preferred embodiment of the present invention, with the steam being supplied to the interior of the hollow drum 118 and the condensate discharged therefrom by means not shown. Drums 118 and 120 are rotated slightly off-center with respect to each other to advance the threads wound thereon. In the preferred embodiment of the present invention, drums 118 and 120 are supported at their free ends by means of the solid bars 124. These supports prevent distortion of the drums under the tension of the drying threads rotating thereon, and also from the expansion and contraction due to the temperature changes thereof, and the use of such supports has been found to be very desirable.

The drying and packaging deck 110 is inclined with respect to the vertical support 122 as in the case of the spinning deck previously described. This permits easy accessibility to each thread comprising the band, and also allows for any excess finish solution remaining from the vacuum stripper 104 to run down and be collected in a small gutter 119 extending along the lower edge of the deck 110.

To remove the vapors and gases discharged during the drying process, a canopy 126 extends over the drying deck and substantially covers the drums 118 and 120. A series of exhaust ports 128 extend through the canopy 126 and discharge into the exhaust manifold 130.

As heretofore indicated a pair of drums 118 and 120 is provided for each thread 50' comprising the coplanar band 50, and the separating and guiding combs 114 are arranged in descending order of width as seen in Figure 4g. As the coplanar band 50 moves across the drying deck 110, each of the threads is in succession led away from the moving coplanar band across the grooved rotatable thread guides 132 at substantially right angles to the path of travel of the remainder of the thread band. From the thread guides 132, the individual threads 50' are wound a number of turns around the drums 118 and 120, with the number of turns being to a degree predicated on the type yarn or threads being produced. The threads are wound on the drums 118 and 120 commencing at the inner ends of the drums and progressing outwardly. From the last turn around lower drums 120 the threads 50' are led vertically upward and around individually grooved rotatable thread guiding rollers 134, secured to the canopy 126. From thread guides 134 the threads descend in a path substantially medially of each pair of drying drums 118 and 120 so as not to come in contact therewith, and through the thread guides 138 which are adjustably mounted on the spring urged arms 139 which in turn are attached to the horizontal shaft 141 mounted beneath the drying drums so as to extend the length of the drying section of the machine. The shaft 141 is supported by the vertical piston shafts 143, which are reciprocated through the cylinders 145 in synchronism with the motion of the twister rings 142 (Figures 8, 8a and 11).

One of the important features of this invention is the use of the drums 118 and 120 to control the tension of the yarn supplied to the twisters which are positioned below these drums. Thus the drums 118 and 120 eliminate the use of a separate yarn feeding and tension control device for feeding the yarn to the twisting bobbins 140.

As will be noted from the previous discussion of the invention, the threads are simultaneously and identically treated during their passage through the various treating troughs so that upon reaching the drums 118 and 120, a series of highly uniform yarn threads are presented to be individually dried and packaged under controlled tension in the manner described.

From thread guides 138, the threads are delivered to individual packaging bobbins 140 rotatably mounted below each pair of drums 118 and 120. Each of the bobbins 140 is driven by a common belt drive 186 (as shown in Figure 11), with means being provided for individually interrupting the rotation of the bobbins, in a manner well understood in the art, and forming no part of the present invention.

In the case of high tenacity, high denier threads suitable for use as tire reinforcements, it is desirable to employ a rather large packaging bobbin of the type shown. Where smaller denier filaments or threads are being produced, smaller and different types of packaging bobbins can be substituted where necessary. Also the above described path of travel of the threads from the lower drums 120 to the packaging bobbins 140 permits packaging of the threads at substantially room temperature, and permits better alignment of the threads with the guides 138, obviating sharp angle turns for the threads. Packaging of the threads while in a heated condition has been found to be undesirable.

Packaging of the threads 50' in either a twisted or untwisted condition is possible with the machine of the present invention. When the threads are to be twisted they are passed through a ring traveler rotatably mounted on a ring twister 142 which is in turn vertically reciprocated by a traverse bar 160 extending the length of the packaging section of the machine (Figure 11). A package builder mechanism suitable for use with the present invention is described and claimed in U.S. Patent 2,364,819.

In order not to interrupt the continuous operation of the machine, each of the bobbins 140 is individually doffed when filled to the proper package size. In order to insure that the delivery of the individual threads 50' to the bobbin being doffed is not interfered with, waste take-up means 144 disposed adjacent to the packaging section of the machine, is provided, see Fig. 9. Waste take-up means 144 comprises a driven reel 146 mounted at substantially right angles to the supporting member 148. Support 148 is provided with the U-shaped yoke member 149 at its upper end, with the rollers 150 being secured to the inner faces of the U-shaped member 149. The I-beam or mono-rail 152 is suspended from, or mounted on the overhead ceiling adjacent to the packaging section of the machine and extends parallel therewith. Rollers 150 permit the waste take-up means to be readily moved on the mono-rail 152 to any position directly opposite a bobbin of thread to be doffed. The take-up reel 146 is rotatably mounted, and is driven by an air motor 151 mounted thereto. An air motor suitable for this purpose is sold by the Mixing Equipment Company of Rochester, N.Y., under the trade name "Lightnin." Air under pressure may be supplied through the hollow supporting member 148, or by means of flexible connection 153 from a source of supply. The speed of the driving air motor can of course be adjusted by varying the amount of air under pressure to the motor. The use of a friction drive such as the air motor described makes it possible to control the speed of take-up on reel 146 by varying the tension on the threads 50' as they are taken up thereon. In initially threading up the bobbins or in replacing full bobbins, it is first necessary that the thread be taken up by the waste reel 146 at the same speed as it is delivered from the drums, and with a constant tension thereon. However, in the process of transferring the thread from the waste take-up reel to its normal take-up by the bobbins 140, it is necessary that a fair degree of slack be had in the thread between the thread guide 138 and the waste take-up reel 146, to permit the insertion of the thread through the ring traveler and twisting ring. Also where a transfer tail is to be provided on bobbins 140, a sufficient length of slack yarn is likewise needed for this purpose. By use of the air driven waste take-up reel 146 the necessary slack in the thread is readily provided, since the speed of the take-up reel 146 is determined by the tension on the thread being taken up thereon, as the speed of the air motor driving the reel is very sensitive to the load placed upon reel 146. The operator need merely to manually increase the tension on the thread being wound on reel 146 to reduce the rate of take-up, to thereby provide the necessary length of yarn for the manipulative steps above described. Any suitable friction drive may be substituted for the air motor described if desired.

The drive arrangement for the various driven elements of the machine is shown schematically in Figures 10a, 10b and 11, and it is felt that a detailed explanation of the driving layout is unnecessary, as the mode of operation will be readily apparent to one skilled in the art. However it is felt desirable to emphasize that an important feature of the machine resides in the use of common drives for powering all of the driven elements of the machine. This arrangement insures that all of the driven elements, from the viscose pumps to the drying drums, are driven at synchronous speeds thereby further guarantying uniformity of thread treatment. While the builder mechanism and spindles could also be powered from a common motor along with the other driven elements, it is not desirable since the spindles must be rotated at variable high speeds dependant upon the twist to be imparted to the threads. By driving the builder mechanism and spindles from a separate common drive, the uniformity of twist and package configuration is assured while uniformity of production treatment and drying is predicated to a degree upon common driving means for effecting these steps.

Motors 162 and 164 are both mounted on the rear end of the drying and packaging section of the machine in the preferred embodiment of the invention. Motor 162 powers the shaft 166 which extends the entire length of the machine back to the end of the spinning section thereof. Shaft 168 is driven from shaft 166 through the gear train 170, and extends the length of the drying and packaging section of the machine. Each pair of drums 118 and 120 are driven from shaft 168.

Each of the pair of tension rollers 44, 46 and 44', 46' are driven from shaft 166 through the bevel gears 172 and 174 respectively, as indicated in Figs. 10a and 10b. Godets 22 and 26 as well as the viscose pumps 21 for the spinning section of the machine are likewise driven from shaft 166 through the belts 176 and 178 and a suitable gear chain as shown diagrammatically in Fig. 10a. Shaft 180 drives all of the godets 26, and shaft 182 drives all the godets 22. Shaft 184 extending the length of the spinning section of the machine powers the viscose pumps 21 which are disposed adjacent to candle filter units 14, Fig. 2, and deliver the spinning solution to the spinnerettes 20, through filter units 14 at a constant rate of delivery in a manner well understood in the art.

Second drive motor 164, Fig. 11, drives the belt 186 which runs the length of the packaging section of the machine, with suitable supporting sheaves such as 188 being provided at spaced intervals to insure proper tension on belt 186. Each of the bobbins 140 is mounted on a rotatable spindle which is driven by contact with belt 186 as is conventional in the winding and twisting art.

A second sheave 190 delivers power to sheave 192 through the medium of belt 194 and idler sheaves 196. Sheave 192 drives the package builder mechanism which in turn controls the up and down motion of the traverse bar 160, and thread guide shaft 141. As indicated, a builder mechanism suitable for use with the present invention is described and claimed in U.S. Patent 2,364,819, and the arrangement shown for this purpose forms no part of the present invention.

In order that the machine, and method of operating therewith, may be more thoroughly understood, a detailed example of the preferred procedure for the continuous production of yarn threads by means of the machine of the present invention will now be presented. The operation will be described in connection with the production of high tenacity threads by means of the viscose process, but as previously indicated, the machine and process of the present invention is not so restricted in its application.

According to the preferred procedure, a viscose solution comprised of 7.62% cellulose, 6.52% alkali, 2.15% total sulphur with a maturity of 11.5 cc. (amount of $NH_4CL$ required to gel a weighed quantity of viscose), and with a viscosity of 45 seconds (ball fall method), was extruded simultaneously through each of the 48 spinnerettes 20 into a common spin bath disposed in the tank 18. The composition of the spin bath was as follows; 100 gr./liter sulphuric acid, 263 gr./liter sodium sulphate and 38.6 gr./liter zinc sulphate at a temperature of 52° C. The spin bath had a flow rate of 94 gal./min. The spinnerettes were immersed 8 inches in the spin bath.

The yarn threads 50' extruded from the spinnerettes were withdrawn from the spin bath by means of the driven godet 22 after threading the freshly formed threads thereon, and were then sent through the hot water stretch bath in tank 24 which was at a temperature of 85° C. with an effective time in contact therewith of .6 second. The threads were withdrawn from the stretch bath by means of the godet 26. Godet 26 was driven at a faster rate of speed than was godet 22 to impart a total stretch of 76.8% to the threads 50' between the two godets.

The above described procedure for producing the threads is more or less conventional in the art, and forms no part of the present invention, except in association with the machine and process as a whole.

From each of the godets 26, the freshly formed threads 50' were led to the spinning deck 30, by means of the thread guides 40. The separating and guiding combs 38 carried the threads across the spinning deck 30 at substantially right angles to their former direction of travel. Upon being joined by the thread from the 48th spinning position the coplanar band was then comprised of 48 thread ends, and was withdrawn from the spinning deck 30 by means of the driven tension rollers 44 and 46. A slight relaxation of the threads comprising the band 50, was permitted between godets 26 and the tension rollers 44 and 46. From the spinning deck, the thread band 50 was moved through the regeneration trough 52 in contact with a dilute hot acid treating bath flowing countercurrent thereto. The composition of the liquid at the outlet was as follows: 2.5 gr./liter sulphuric acid, 8 gr./liter sodium sulphate, 1 gr./liter zinc sulphate; temperature midway in trough 95° C. with the liquid flowing at a rate of 2.5 gal./min. through the trough. The separating and guiding combs 58 disposed transversely of the trough were arranged in the following order, stated in inches from the point of entrance of the thread band in the trough 52; 6, 27, 48, 69 and 90. The dams 60 were arranged in the trough 52 in the following order stated in inches from the entrance of the thread band; 16, 37, 58, and 79. The effective bath travel in the trough 52 was 96 inches and the effective time of treatment of the moving thread band was 2.9 seconds. The above described liquid treatment insured the complete regeneration of the threads and also permitted to some extent the removal of impurities from the threads.

From the regeneration trough 52, thread band 50 was moved around the tension rollers 44 and 46 and through the washing trough 68 by means of the positively driven tension rollers 44' and 46', arranged in the manner previously described, with a stretch of .44% being exerted on the thread band between the two sets of tension rollers. The washing and desulphurizing bath was introduced at the upper end 82 of the trough 68, and comprised hot water at a temperature of 73° C. with a flow rate of 10 gal./min. The separator combs 70 were arranged in the trough in stages, with a stage comprising the space between each pair of dams. The combs were disposed in the following stages, commencing from the point of entrance of the thread band; 2, 6, 10, 16, 22, 28, 36 and 44. The space between the combs and trough bottom was .25 inch. The depressor bars were disposed in the following stages numbering from the lower end of trough 68; 1, 3, 7, 11, 17, 23, 29, 37.

The depressor bars were arranged so as to rest .5 of an inch from the bottom of the trough 68, with the dams 78 being spaced from the bottom of the trough approximately .078 inch, while the trough 68 was provided with a slope of .263 inch fall per foot of trough. The effective bath travel was 400 inches and the effective time of treatment of the thread band was 12.2 seconds in its passage through trough 68.

As heretofore indicated, the thread band 50 first made contact with washing water which had already flowed down the trough 68 in contact with the thread band. As the thread band progressed up the trough 68 it was progressively contacted by cleaner treating water. The passage of thread band 50 through washing trough 68 effected a substantially complete and thorough washing of the threads.

The effectiveness of the washing received in trough 68 is surprising, since the length of travel and effective time of treatment of the threads is relatively short. However it is believed that the effectiveness of the washing treatment results, on the one hand, from the countercurrent movement of the threads at the surface of the flowing treating water, with each of the threads being spread out ribbonwise by means of the dams and depressors previously described, in a manner to expose each filament comprising a thread to the thorough permeation of the treating water, coupled with the arrangement of the dams within the trough which creates a series of whirlpools of treating liquid, and also throws the treating water against the under side of the threads as they pass over each pair of dams. The arrangement of the regeneration trough and the dams within trough 68 represent important modifications over the aforesaid Hofmann machine.

Upon emerging from regeneration trough 68, thread band 50 moved through the finish trough 92, which is of rectangular shape and of much shorter length than the trough 68, but with slightly greater depth. The finish trough 92 was maintained very slightly inclined as previously indicated. Trough 92 was supplied with an oil type finish solution adaptable for use on the high tenacity viscose threads being processed. In connection with the present example wherein a high tenacity thread was being produced from viscose, the finish preparation sold by the Nopco Chemical Co. under the trade name Nopco 2169M was employed. Each thread 50' was passed across the vacuum stripper 84 before entering the finish bath, with each thread passing through an individual slot 86 of the stripper, whereby the excess wash water from trough 68 was removed. The threads in their passage through the finish bath were carried below the surface of the finish solution as shown in Figure 5f, and upon emerging from the finish trough the threads were carried across the second vacuum stripper 104, arranged to exert a suction on each individual thread during the passage thereover in the manner described in connection with the stripper 84.

The thread band 50 was next threaded around the second pair of rotating tension rollers 44' and 46' which served as the tension control means for the band. From the upper tension roller 44' the thread band was led to the drying deck where each thread of the band was placed in position in the separating and guiding combs 114, arranged on the drying and packaging deck 110 in the same manner as described in connection with the spinning deck. However, the combs 114 were arranged in descending order of width as shown in Figure 4h. The combs 114 were disposed in pairs with their hooked portions oppositely facing to substantially lock in the threads once positioned in their respective slots between the teeth of the combs. Threads 50" (Figure 4g) which was produced from the last spinning position, and was therefore the last to join the coplanar band, was first disassociated from the coplanar band 50, and directed at substantially right angles to the path of travel of the band 50 by means of the rotatable thread guide 132. The remaining threads were successively removed from band 50 and carried by the guides 132 to the lower thread advancing drum 120, whereupon each thread was laced a number of turns around the drums 118 and 120 provided for each thread. Both the drums 118 and 120 were positively driven by the shaft on which the drums were mounted in the manner shown in Figure 10b. Drums 118 and 120, by exerting individual tension on the threads comprising the band 50 served to move the band collectively across the drying and packaging deck 110. Therefore, drums 118 and 120 acted as thread storage-thread advancing means as well as serving the function of drying the after-treated threads.

A shield 154, see Figs. 8 and 8a, was provided between each pair of drums and the bobbins 140 disposed therebeneath, to prevent contact of the threads with each other which might result from the ballooning effect produced from the high speed winding of the threads.

The thread advancing drums 118 and 120, in their preferred form, have a diameter of 6.983 inches and the threads were given an effective drying time of 28.1 seconds in contact with the drums. The upper drum 118 was heated by steam under 10 lbs./sq. in. pressure in the preferred form of the machine, yielding a temperature at the surface of the drum of 115 to 120° C. Each thread was given 23 loops per pair of drums in its passage therearound.

From the drying drums, the threads were led over the guides 134, to allow time for cooling of the threads prior to twisting, and thence through the thread guides 138 down to the bobbins 140. In the production of high tenacity yarn of the type being described, a small twist was imparted to the threads while being packaged. A ring twister was employed for this purpose having a ring height of 1 inch and a ring diameter of 8 inches. The spindles or bobbins 140 were rotated at 3100 r.p.m.

with a cycle of 2 traverse strokes per minute yielding a packaged thread having a Z twist of 1.5 t.p.i.

The manner of using the waste take-up reel 146 has been described previously in some detail, and it will be understood that the threads are continually delivered from the drums 118 and 120 and that the threads 50' will be taken up by the reel 146 while threading up the threads through the ring traveler and ring twister. As soon as this is accomplished and the free end of the thread secured to the bobbin, the operator initiates rotation of the bobbins on an individual basis, while simultaneously breaking the thread portion leading to reel 146.

In stringing up the thread band through the various separating and guiding combs and through the treating troughs, a hand operable portable comb of the type disclosed in the Hofmann patent referred to may be conveniently employed to aid the operator in handling the large band of thread ends. Also a series of tow guides 97, Figs. 4d and 5d, are arranged medially of the regeneration trough and the washing trough to permit the handling of the thread band in the form of a composite tow prior to positioning each of the threads in their respective positions in the regeneration trough and the washing trough, with waste take-up rollers 25 and 108 being used to exert tension on the tow while the individual threads are being properly positioned.

The high tenacity threads, the production of which has just been described possessed the following physical properties: 1651 denier, dry strength of 3.90 gr./den., a wet strength of 2.2 gr./den., a conditioned g./den. elongation of 12.1% and a g./den. elongation wet of 22.1%, a dry shrinkage of 5.15% and a wet shrinkage of 3.60%. Corded threads of the above physical characteristics showed a fatigue of 65.6 hours as measured on the U.S. Rubber Company extension fatigue tester.

It will be observed that the process and machine of the present invention is capable of continuously producing a finished thread having greately improved physical characteristics, and that once operation of the machine is initiated, a continuous finished packaged product is delivered at a point spaced in line from the point of extrusion. The machine of the present invention is capable of continuous operation for extended periods, with little or no supervision, thereby reducing the number of operators required. Also the amount of inferior yarn threads produced is much lower than with the conventional spool and pot spinning processes. The above desiderata are very important in the art to which this invention pertains, and the herein described machine and process has proven capable of accomplishing the stated objects in a highly meritorious fashion.

Having now described our invention in detail we claim:

1. In apparatus for the continuous production of high tenacity viscose rayon thread which comprises means for producing a plurality of freshly extruded viscose threads in side by side relation, means for joining said threads in a spaced relationship in the form of a coplanar band of moving threads, a series of inclined treating troughs disposed with their long axis in the path of travel of said moving band of threads, and means for introducing treating liquid at the elevated end of each of said troughs; the improvement comprising a series of pairs of dams spaced from each other extending across one of said troughs, said pair of dams each comprising a low dam positioned at the bed of the trough and an elevated dam spaced from the trough bed and extending upwardly to a plane above the low dam whereby, as the treating liquid flows downwardly in said trough and engages the dams of each pair it is thrown upwardly against said moving thread band and the treating liquid has a degree of turbulence imparted thereto between said pairs of dams.

2. In a process of producing synthetic yarn the steps in sequence comprising extruding a spinning solution into a spin bath to form therein a plurality of separate multifilament threads, joining while continuously moving said threads to form a coplanar band of spaced threads, passing the thread band through a bath of wet-treating liquid while upsurging the liquid through the band at spaced points in its travel, individually separating the wet-treated threads from said coplanar band, continuously and separately drying the separated threads under tension while preventing shrinkage and continuously and separately twisting the dried threads under a reduced tension to form a plurality of separate yarn packages.

3. A process for producing high tenacity viscose rayon which comprises extruding a viscose solution into an acid spin bath to form therein a plurality of separate multifilament partially regenerated viscose threads, joining said threads into spaced relationship to form a coplanar band of spaced threads, completing the regeneration of said viscose threads while continually moving said threads spaced in said coplanar band, controlling the tension of said threads during said movement thereof, individually separating the wet-treated threads under a reduced tension from said coplanar band, continuously and separately drying the separated threads under tension while preventing shrinkage, and continuously and separately twisting the dried threads to form a plurality of separate yarn packages.

4. A continuous process for producing high denier high tenacity rayon threads suitable for use as reinforcement in rubber tires by the viscose spin bath process which comprises continuosly positioning a multiplicity of freshly extruded viscose threads in the form of a coplanar band, treating said threads in a series of contiguous liquid treating zones including passing said threads in one of said zones through a stream of treating liquid at substantially the surface thereof, flowing treating liquid through said zone countercurrent to the movement of said threads, vertically directing streams of said treating liquid against the threads of said moving coplanar band from the undersides thereof during the passage of said band through said zone and at a multiplicity of places in said zone to facilitate the thorough treatment of the threads, separating individual threads from the moving band, and drying the individual threads.

5. A wet spinning process for the continuous production of a plurality of threads of yarn of substantially uniform characteristics comprising the steps of simultaneously spinning a plurality of multi-filament threads of yarn, arranging said threads side by side, moving said threads side by side through a plurality of liquid treating troughs, spreading each of said threads into a permeable ribbon while they are passed through said liquid treating troughs, periodically upsurging the treating liquid against said permeable ribbon shaped threads in the course of the passage thereof through a portion of said troughs, individually separating said threads from said side by side arrangement, individually drying said threads, imparting a slight twist to the threads to bring the individual filaments thereof together from said permeable ribbon configuration imparted thereto in said troughs so as to hold the filaments of the threads collected.

6. In a system for the continuous production, treatment and collection of synthetic threads, a plurality of means adjacent one end of the system for extruding a spinning solution into a spin bath to form a plurality of threads, a second bath through which the threads are individually passed and stretched, an inclined deck elevated above the said baths provided with a series of guide members by which the individual threads are guided into position to form a coplanar band moving in parallel relation to the deck, the inclination of the deck being transverse to the movement of the threads and being such that the threads moving thereover are horizontally displaced to permit independent drainage of treating liquids therefrom and the drainage of liquid to flow to the side of the deck adjacent the baths, means for conducting the drainage along the lower edge of the deck, a second elevated deck at the opposite end of the system over which the threads are passed as a coplanar band, said deck being inclined transversely to the movement of the threads, means for individually removing and drying the threads under tension, a series of elongated troughs extending between the decks and positioned below the elevation thereof, and common means for directing the band of threads downwardly and through the treating liquid in each of the troughs adjacent its surface whereby the individual threads are subject to individual manipulation from the source of formation to the points of collection and may be viewed from a common level.

7. A wet spinning process for the continuous production of a plurality of threads of yarn of substantially uniform characteristics comprising the steps of simultaneously spinning a plurality of multi-filament threads of yarn, arranging said threads side by side, moving said threads side by side through a plurality of liquid treating troughs, spreading each of said threads into a permeable ribbon while they are passed through said liquid treating troughs, periodically upsurging the treating liquid against said permeable ribbon shaped threads in the course of the passage thereof through a portion of said troughs, individually separating said threads from said side by side arrangement, individually drying said threads, cooling the threads to room temperature subsequent to said drying, slightly twisting said threads to hold the individual filaments of each of the threads collected and individually winding the threads on bobbins.

References Cited in the file of this patent

UNITED STATES PATENTS

| | | |
|---|---|---|
| 1,803,475 | Kampf | May 5, 1931 |
| 2,203,793 | Lovett | June 11, 1940 |
| 2,334,325 | Heim | Nov. 16, 1943 |
| 2,416,533 | Naumann | Feb. 25, 1947 |
| 2,533,248 | Helmus | Dec. 12, 1950 |
| 2,558,734 | Cresswell | July 3, 1951 |
| 2,587,619 | Hofmann | Mar. 4, 1952 |